United States Patent
Ito et al.

(10) Patent No.: US 7,664,912 B2
(45) Date of Patent: Feb. 16, 2010

(54) DATA RECORDING APPARATUS, DATA RECORDING METHOD, AND PROGRAM

(75) Inventors: Ryogo Ito, Tokyo (JP); Junichi Yokota, Kanagawa (JP); Hiroshi Shimono, Tokyo (JP)

(73) Assignee: Sony Corporation (JP)

( * ) Notice: Subject to any disclaimer, the term of this patent is extended or adjusted under 35 U.S.C. 154(b) by 526 days.

(21) Appl. No.: 11/711,881

(22) Filed: Feb. 27, 2007

(65) Prior Publication Data
US 2007/0279787 A1 Dec. 6, 2007

(30) Foreign Application Priority Data
Feb. 28, 2006 (JP) ............ P2006-051684

(51) Int. Cl.
*G06F 13/00* (2006.01)
*G11B 5/09* (2006.01)

(52) U.S. Cl. ............ 711/112; 711/100; 711/111; 711/154

(58) Field of Classification Search ........... 711/100, 711/111, 112, 154; 360/48
See application file for complete search history.

(56) References Cited

U.S. PATENT DOCUMENTS

| | | | |
|---|---|---|---|
| 3,656,130 A * | 4/1972 | Bucklin et al. | 360/78.04 |
| 6,778,346 B2 * | 8/2004 | Takayama et al. | 360/69 |
| 7,082,007 B2 * | 7/2006 | Liu et al. | 360/77.02 |
| 7,237,001 B2 * | 6/2007 | Yokono et al. | 709/200 |

FOREIGN PATENT DOCUMENTS

JP 2005-063047 A 3/2005

* cited by examiner

*Primary Examiner*—Tuan Van Thai
(74) *Attorney, Agent, or Firm*—Lerner, David, Littenberg, Krumholz & Mentlik, LLP

(57) ABSTRACT

Disclosed herein is a data recording apparatus which may include a recording data acquisition section, a data recording section, a file management section, a recording control section, and a file updating control section.

11 Claims, 22 Drawing Sheets

FIG. 8

| | START POSITION OF REQUEST RESPONSE WRITE DATA | END POSITION OF REQUEST RESPONSE WRITE DATA | FILE BODY WRITING TIME NUMBER |
|---|---|---|---|
| PATTERN 1 | TOP OF CLUSTER | HALFWAY OF CLUSTER | 2 |
| PATTERN 2 | HALFWAY OF CLUSTER | LAST END CLUSTER | 2 |
| PATTERN 3 | HALFWAY OF CLUSTER | HALFWAY OF CLUSTER | 3 |
| PATTERN 4 | TOP OF CLUSTER | LAST END CLUSTER | 1 |

FIG.15A

BACKUP INFORMATION

| PROCESSING TIMING (2 BYTES) |
|---|
| START CLUSTER NUMBER (4 BYTES) |
| END CLUSTER NUMBER (4 BYTES) |
| DIRECTORY ENTRY STORAGE SECTOR (512 BYTES) |
| LBA OF DIRECTORY ENTRY STORAGE SECTOR (4 BYTES) |

※ DIRECTORY ENTRY HAS SUBSTANCE CORRESPONDING TO COMPLETION OF RECORDING

FIG.15B

| PROCESSING TIMIMG | VALUE |
|---|---|
| tm0 | 0x10 |
| tm1 | 0x21 |
| tm2 | 0x22 |
| tm3 | 0x23 |
| tm4 | 0x30 |
| tm5 | 0x40 |
| tm6 | 0x00 |

FIG.20

BACKUP INFORMATION

| PROCESSING TIMING (2 BYTES) |
|---|
| START CLUSTER NUMBER (4 BYTES) |
| END CLUSTER NUMBER (4 BYTES) |
| DIRECTORY ENTRY STORAGE SECTOR (512 BYTES) |
| LBA OF DIRECTORY ENTRY STORAGE SECTOR (4 BYTES) |
| START LBA OF FILE BODY (3) |
| SIZE OF FILE BODY (3) (4 BYTES) |
| WRITE DATA OF FILE BODY (3) (VARIABLE) |

※ DIRECTORY ENTRY HAS SUBSTANCE CORRESPONDING TO COMPLETION OF RECORDING

DATA RECORDING APPARATUS, DATA RECORDING METHOD, AND PROGRAM

CROSS-REFERENCE TO RELATED APPLICATIONS

This application claims priority from Japanese Patent Application No. JP 2006-051684, filed in the Japanese Patent Office on Feb. 28, 2006, the entire content of which is incorporated herein by reference.

BACKGROUND OF THE INVENTION

1. Field of the Invention

This invention relates to a data recording apparatus and method for recording data to be managed as a file of a predetermined format and also to a program for being executed by a data recording apparatus of the type described.

2. Description of the Related Art

A digital image pickup apparatus which can pick up moving pictures such as a digital video camera handles a moving picture file obtained by image pickup as data to be recorded on a recording medium. Therefore, a corresponding large storage capacity is demanded for the recording medium. In the past, mainly tape media were used as a storage medium which can satisfy such a demand as just mentioned. However, in recent years, also a hard disk drive (HDD) is adopted on the background of significant reduction in cost by a drop of a price per bit, enhancement of an impact resisting property and other advantages.

Since originally a HDD is used as an auxiliary storage device for a computer system, a file system of a predetermined format is adopted for management of recording data. As well known in the art, according to a file system, data stored in a storage medium are managed in a unit of a file. A FAT file system is known as one of formats for such a file system as just mentioned.

In the FAT file system, the storage area of a storage medium is divided into unit regions called clusters. Accordingly, recording of a file on the storage medium is performed such that data are successively written into a cluster or clusters. Then, the file recorded on the storage medium is managed as a concatenation of clusters in which the entity of the data is written. As well known in the art, in the FAT file system, directory entries and table information called FAT (File Allocation Table) are used as management information for managing files in such a manner as described above.

Such a FAT file system as described above is disclosed, for example, in Japanese Patent Laid-Open No. 2005-63047.

Also where a HDD is used as a storage medium of a digital video camera, it is efficient and proper to adopt a file system of a format which has been used heretofore because there is no necessity to develop a new management system. Also in an actual digital video camera with a built-in HDD, a format of a file system known already such as, for example, the FAT file system described above is adopted.

However, as described hereinabove, from such a situation that a file system such as the FAT file system has been developed under old computer systems as described above, several kinds of control to be executed by the file system are suitable for management of static files such as document files. Thus, if such control is applied as it is as control applied where stream data of a moving picture file or the like are successively recorded on the real-time basis, then unintended disadvantages may possibly occur.

SUMMARY OF THE INVENTION

Where such a situation as just described is taken into consideration, it is considered preferable to adopt, if it is intended to incorporate, in a digital video camera, a storage medium for which a file system is adopted properly, a data management format of a file system basically same as an existing file system while recording of stream data of moving pictures or the like is performed for a portion of data for which such recording is required thereby to achieve enhancement of the reliability and the performance.

According to one embodiment of the present invention, there is provided a data recording apparatus. The apparatus may include a recording data acquisition section configured to acquire, as data to be recorded on a recording medium, request response write data which is a unit of data to be written on the recording medium in response to a data writing request. The apparatus may further include a data recording section configured to execute data recording on the storage medium so as to write data into unit regions of a predetermined capacity formed successively in a storage region of the recording medium. The data recording section may execute the data recording such that, when the request response write data corresponding to one data writing request is to be written using two or more of the unit regions and besides any of the top and the last end of the request response write data is to be written at an intermediate position of one of the unit regions, a partial writing process of writing the request response write data portion to be placed into the unit region which includes the intermediate position and another partial writing process of writing the remaining request response write data to be placed into one or more logically successive ones of the unit regions into which only those data which form the request response write data without including the intermediate position are to be placed are executed. The apparatus may still further include a file management section configured to manage files making use of management information which is stored in the storage medium on which data of files are stored and manages data which form the files for the unit regions, and a recording control section configured to control the data recording section to execute, when the request response write data is to be recorded on the storage medium by two or more of the partial writing processes, recording of the request response write data by the sequential partial writing processes without inserting an updating process of the management information at a timing corresponding to completion of each of the partial writing processes. The apparatus may yet further include a file updating control section configured to control, at a timing after the recording of the request response write data by the sequential partial writing processes is completed, the file management section to update the management information so that results of all of the partial writing processes are reflected on the management information.

In the data recording apparatus, the storage region of the storage medium may be formed as a concatenation of unit regions of a predetermined capacity. Where data (write request data) to be written in response to a data writing request is written using two or more ones of the unit regions in such a format structure of the storage medium as just described and the top or the last end of the write request data is to be written into an intermediate position of one of the unit regions, recording of the write request data may be performed by executing a partial writing process of writing a data portion into the unit region which includes the intermediate position and another partial writing process of writing only those data which form the request response write data without including the intermediate position into one or more logically successive ones of the unit regions.

Further, in the data recording apparatus, where recording of write request data is performed by two or more partial writing processes as described above, when the partial writing processes are executed sequentially, updating of the management information at a timing corresponding to completion of each of the partial writing processes may not be performed during the process of the execution. Then, at a timing after the entire sequence of the partial writing processes is completed, updating of the management information may be performed so that results of all of the partial writing processes are reflected on the management information.

Where the management information is updated otherwise at a timing corresponding to completion of each partial writing process during writing of one write request data, for example, even if a certain later one of the partial writing processes results in failure, data recorded without failure by a preceding or former one or ones of the partial writing processes is reflected on the management information and managed as effective recorded data. However, even if data is recorded without failure by the former partial writing process or processes, if at least part of the thus recorded data and at least part of data whose recording by the later partial writing process results in failure have an inseparable relationship to each other in the write request data, then this conversely gives rise to such a disadvantage that, for example, a normal reproduction result cannot be obtained.

In contrast, with the data recording apparatus according to the present invention, if a certain later partial writing process results in failure, then the corresponding write request data itself may be prevented from being reflected on the management information. Consequently, such a result that only part of data which originally has an inseparable relationship may be recorded such that it is reflected on the management information is prevented.

In summary, with the data recording apparatus, such a result that only part of data which originally has an inseparable relationship is recorded such that it is reflected on the management information does not occur. Consequently, enhancement of the reliability and the performance of the apparatus can be achieved in that, for example, a normal reproduction result is assured with regard to data recorded on the recording medium by the data recording apparatus.

BRIEF DESCRIPTION OF THE DRAWINGS

FIG. 8 is a view illustrating a characteristic for each pattern of a corresponding relationship between request response write data which forms a moving picture file and sectors where the request response write data is recorded on a storage medium managed by the FAT file system;

FIGS. 15A and 15B are views illustrating an example of a structure of backup information in the digital video camera;

FIG. 20 is a view illustrating an example of a structure of backup information corresponding to the modification to the procedure for matching restoration;

DETAILED DESCRIPTION

In the following, the best mode (hereinafter referred to as embodiment) for carrying out the present invention is described. In the embodiment described below, the present invention is described in connection with an example wherein a configuration of a data recording apparatus according to the present invention is applied to a digital video camera.

Figure 1:
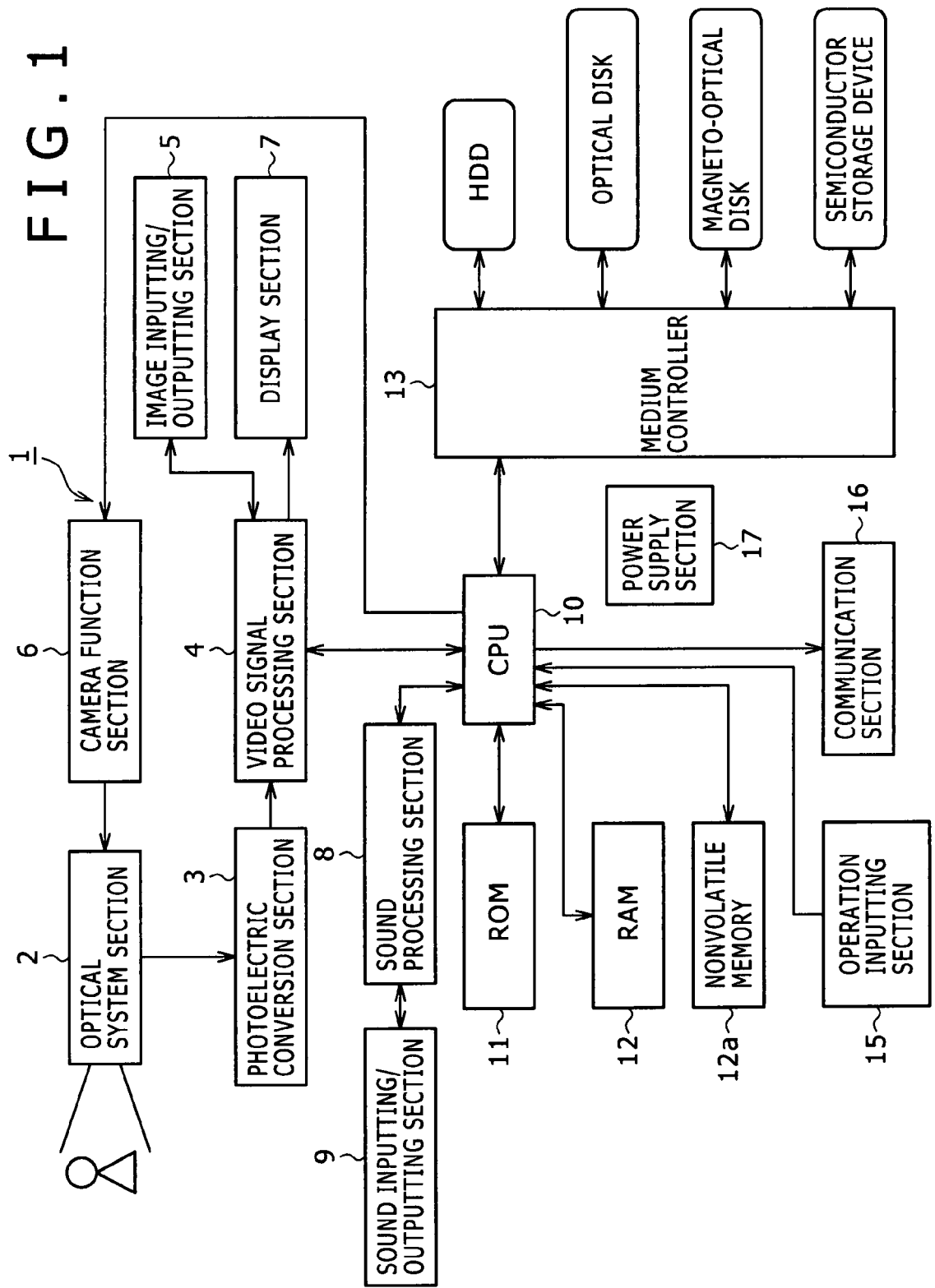
FIG. 1 is a block diagram showing an example of a configuration of a digital video camera to which the present invention is applied.

Referring first to FIG. 1, there is shown an example of a configuration of a digital video camera to which the present invention is applied.

The digital video camera 1 shown includes an optical system section 2 which includes an image pickup lens, a iris and so forth and uses light incoming thereto as image pickup light to form an image on a photoelectric conversion section 3. The optical system section 2 further includes a focusing mechanism for focusing, a variable iris mechanism for varying the iris in response to a iris value and so forth. Driving of the mechanical elements of the optical system section 2 is performed in response to driving signals outputted from a camera function section 6. The camera function section 6 outputs required driving signals so that a required focus state, iris state and so forth are established under the control of a CPU (central processing unit) 10.

Further, for example, where the digital video camera 1 has an optical zooming function, a zoom mechanism for moving a zoom lens may be provided in the optical system section 2, and a driving section for moving the zoom mechanism under the control of the CPU 10 may be provided similarly as described above. Further, a flash apparatus may be provided in the camera function section 6 so that a flash light emitting function is provided for the digital video camera 1.

The photoelectric conversion section 3 includes, for example, a CCD (Charge Coupled Device) unit as a photoelectric conversion element, and photoelectrically converts image pickup light incoming from the optical system section 2 and formed on the light receiving face thereof to produce an image pickup signal. The image pickup signal is outputted to a video signal processing section 4. Upon image pickup, for example, an instruction of a shutter speed determined in response to a result of the exposure setting is issued from the CPU 10 to the video signal processing section 4. The video signal processing section 4 outputs the scanning timing signal corresponding to the shutter speed of the received instruction to the photoelectric conversion section 3. The photoelectric conversion section 3 performs scanning in response to the scanning timing signal to execute a photoelectric conversion process and outputs a resulting video signal.

The video signal processing section 4 performs, for example, gain adjustment and sample hold processes for the analog video signal (picked up image signal) inputted from the photoelectric conversion section 3 to shape the waveform of the video signal. The video signal processing section 4 further performs A/D conversion for the resulting video signal to convert the video signal into digital video signal data. Then, the video signal processing section 4 performs, for the digital video signal obtained by the conversion process, video signal processes for allowing the digital video signal to be displayed on a display section 7 such as, for example, a production process of display luminance data. Further, the video signal processing section 4 can execute also a signal process for on-screen display so that also a character image or the like can be displayed in an overlapping relationship with a picked up image under the control of the CPU 10.

Although an actual display device to be adopted as the display section 7 is not restricted particularly, under present conditions, a liquid crystal display panel is adopted widely.

Furthermore, the video signal processing section 4 can perform, for example, a compression coding process according to a predetermined method for the digital video signal obtained by conversion of the analog video signal inputted from the photoelectric conversion section 3 to produce compressed video data.

Further, the digital video camera of the present embodiment has also a still camera function. In other words, the digital video camera can produce a still picture data file of a predetermined format as a photograph from a picked up image signal. Also such an image process as just mentioned is performed by the video signal processing section 4.

Further, the video signal processing section 4 can convert an image (video) signal inputted from the photoelectric conversion section 3 or a file of moving pictures, still pictures or sound read out from a storage medium hereinafter described into an analog video signal or a digital video signal of a predetermined system. The video signal processing section 4 outputs the analog or digital video signal to an external apparatus or the like through an image inputting/outputting section 5.

The image inputting/outputting section 5 can receive a video signal of a predetermined system as an input thereto from the outside and cause the inputted video signal to be displayed on the display section 7 through processing of the video signal processing section 4. Further, the video signal processing section 4 can convert a video signal inputted thereto from the image inputting/outputting section 5 into recording data similarly to the analog video signal inputted from the photoelectric conversion section 3 and transfer the recording data to a medium controller 13.

In a corresponding relationship, the image inputting/outputting section 5 has a video (image) signal output terminal and a video signal input terminal, for example, for a predetermined system.

Further, the digital video camera 1 of the present embodiment includes a sound processing section 8 and a sound inputting/outputting section 9 so that a sound signal can be inputted to and outputted from the digital video camera 1.

In particular, as regards the sound input, the digital video camera 1 includes a microphone or the like as the sound inputting/outputting section 9 so that external sound is collected and converted into a sound signal to be inputted. The sound signal inputted in this manner is outputted to the sound processing section 8. The sound processing section 8 performs, for the sound signal inputted thereto, such a sound signal process as to convert the sound signal into compressed audio data which is encoded, for example, in accordance with a sound compression coding system corresponding to the compression coding system for a picked up image.

The CPU 10 executes a control process for forming a moving picture file of a predetermined format from compressed video data of picked up images obtained by the video signal processing section 4 and compressed audio data of collected sound obtained by the sound processing section 8. In the moving picture file, moving pictures reproduced from compressed video data and outputted have a reproduction time axis synchronized with that of sound reproduced from compressed audio data. It is to be noted that, as a configuration for actually forming a moving picture file, a software configuration which involves a digital signal process obtained by execution of a program by the CPU 10 may be used. Alternatively, another configuration may be used wherein hardware for forming a moving picture file is provided and the CPU 10 controls operation of the hardware.

Data of the moving picture file are, for example, transferred as recording data to the medium controller 13 under the control of the CPU 10. Further, the CPU 10 can transfer a still picture data file of a predetermined format as photographic images produced by the video signal processing section 4 as recording data to the medium controller 13.

The sound inputting/outputting section 9 may be configured also such that it includes a sound signal input terminal so that an audio signal may be inputted to the sound inputting/outputting section 9 from an external audio apparatus or the like. The audio signal inputted from the sound signal input terminal is converted into a digital data file of a predetermined format by the sound processing section 8. The CPU 10 can transfer also such data of a digital audio data file as recording data to the medium controller 13.

The medium controller 13 is configured such that it cooperates with the CPU 10 to execute a control process relating to a data process for any of predetermined storage media and external storage devices of different types. The data process for a storage medium here signifies some process relating to data to be stored into a storage medium such as a formatting process of a storage medium and writing/reading out processes of a file into and from a storage region of the storage medium and information (file management information) for management of the file.

In the present embodiment, a hard disk drive (HDD) is connected to the medium controller 13. The HDD is a storage device including a magnetic disk called hard disk as a storage medium as well known in the art. With the HDD, under present conditions, a large storage capacity of a gigabyte class can be obtained at a comparatively low cost. Further, as well known in the art, physical reading out/writing of data on/from a magnetic disk as a storage medium is performed by performing application/detection of a magnetic field while a track formed on the magnetic disk is traced by means of a magnetic head.

Further, the HDD in this instance, for example, may be fixedly built in the digital video camera 1 or may be formed as a removable medium confirming to predetermined standards which can be loaded into the digital video camera 1 (host apparatus).

Further, the medium controller 13 can perform a data process suitable for an optical disk or a magneto-optical disk of a predetermined system or a semiconductor storage device which is a storage device which includes a semiconductor memory element.

In order to actually cope with an optical disk or a magneto-optical disk, the digital video camera 1 includes a device as a drive configured so as to perform writing/reading out of data into/from the recording or storage medium, and the device and the medium controller 13 are connected to each other.

In order to cope with a semiconductor storage device, the body of the digital video camera 1 includes a slot into which a semiconductor storage device is removably inserted in accordance with actual standards for the semiconductor storage device. If a semiconductor storage device is loaded appropriately into the slot, then pin terminals of the semiconductor device are connected to electrodes at a connector location of the slot so that the semiconductor storage device is connected for communication to the medium controller 13.

In this manner, while the digital video camera 1 of the present embodiment is configured to process data in accordance with various media, for the convenience of simplified description, it is assumed that the medium into and from which data obtained by image pickup by the digital video camera 1 of the present embodiment are to be recorded and reproduced is a HDD.

The medium controller 13 transfers, in response to recording data transferred thereto as described hereinabove, the recording data to a medium selected as an object from among those media (storage medium and storage device) which are connected to the medium controller 13. The medium to which the data are transferred writes the data into a storage region thereof in accordance with an instruction from the medium controller 13 side to store the data. The data stored in the medium in this manner are managed as a file. It is to be noted that management of filed stored in the storage medium is performed in accordance with a predetermined file system.

On the other hand, for example, when a moving picture file from among files stored in the storage medium is reproduced, the CPU 10 and the medium controller 13 access and read out the designated moving picture file. The moving picture file read out in this manner is separated into compressed video data and compressed audio data, for example, by a process of the CPU 10. The compressed video data are passed to the video signal processing section 4 while the compressed audio data are passed to the sound processing section 8.

The video signal processing section 4 and the sound processing section 8 in this instance execute required reproduction signal processes including a demodulation process for the compressed video data and the compressed audio data transferred thereto, respectively. Thus, an image obtained by reproduction of the compressed video data is displayed on the display section 7. Meanwhile, a sound signal obtained by reproduction of the compressed audio data is outputted as sound from a speaker provided for the sound inputting/outputting section 9 or is outputted from a headphone terminal in synchronism with the reproduction of the image.

Further, for example, an audio data file reproduced from the storage medium can be outputted, after it is subject to a sound signal process by the sound processing section 8, as an audio signal or audio data of a predetermined format to the outside through the sound inputting/outputting section 9. In this instance, the sound inputting/outputting section 9 includes audio output terminals corresponding to a predetermined audio signal and audio data to be outputted from the sound processing section 8.

The CPU (Central Processing Unit) 10 executes a program to execute various control processes for the digital video camera 1. A ROM 11 stores various programs to be executed by the CPU 10 and various kinds of setting information and so forth to be used when the CPU 10 executes its processing. A RAM 12 is used as a working area when the CPU 10 executes its processing in accordance with a program, and retains data of results of various arithmetic operation processes.

A nonvolatile memory 12a is formed from a memory element which has a nature that, even if the power supply thereto stops, the stored substance thereof is not erased as represented, for example, by a flash memory. Writing/reading out of data into/from the nonvolatile memory 12a is performed under the control of the CPU 10. Data (information) to be stored into the nonvolatile memory 12a usually is setting information whose substance is modified suitably, but is not limited particularly. Thus, only it is necessary for the nonvolatile memory 12a to store various kinds of required information in accordance with specifications of the actual digital video camera 1.

An operation inputting section 15 in this instance collectively represents various operation elements provided on the digital video camera 1. For example, the operation elements of the operation inputting section 15 include a shutter button to be operated upon image pickup, operation elements for selecting image pickup modes and so forth, operation elements for increasing/decreasing parameters and so forth.

Further, the operation inputting section 15 in this instance has a configuration for implementing an inputting operation for a GUI which makes use of a display screen of, for example, the display section 7.

A communication section 16 is configured from hardware and software for communicating with an external device in accordance with a predetermined data communication method under the control of the CPU 10. The data communication method corresponding to the communication section 16 is not particularly limited to a wired or wireless communication method, and also the number of compatible data communication methods is not limited particularly. Under present conditions, the data communication system may be, as a wired communication system, any of a network such as, for example, Ethernet and data bus standards such as USB (Universal Serial Bus) or IEEE (the Institute of Electrically and Electronic Engineers) 1394. As a wireless communication system, the data communication system may be short distance radio communication standards between devices such as the Bluetooth (Trademark) or radio LAN (Local Area Network) standards such as IEEE 802.11a/b/g.

A power supply section 17 supplies operating power to various hardware devices of the digital video camera 1 and includes, for example, a power supply circuit which receives and operates with power from a battery or a power supply adapter.

As described above, the digital video camera 1 of the present embodiment can store a video/audio file obtained principally by image pickup/sound collection on a storage medium such as a HDD, various optical disk-type recording media (including a magneto-optical disk) and a semiconductor storage device.

Files stored in such a manner as described above are normally managed by a file system of a predetermined format. In the present embodiment, the files are managed by a FAT (File Allocation Table) file system. The FAT file system manages the files using a tree-type directory structure and involves writing/reading out of data in a logical minimum data unit called cluster as well-known in the art. The cluster is a unit which includes a predetermined number of sectors which are minimum units of physical data writing/reading out on/from a medium.

Figure 2:
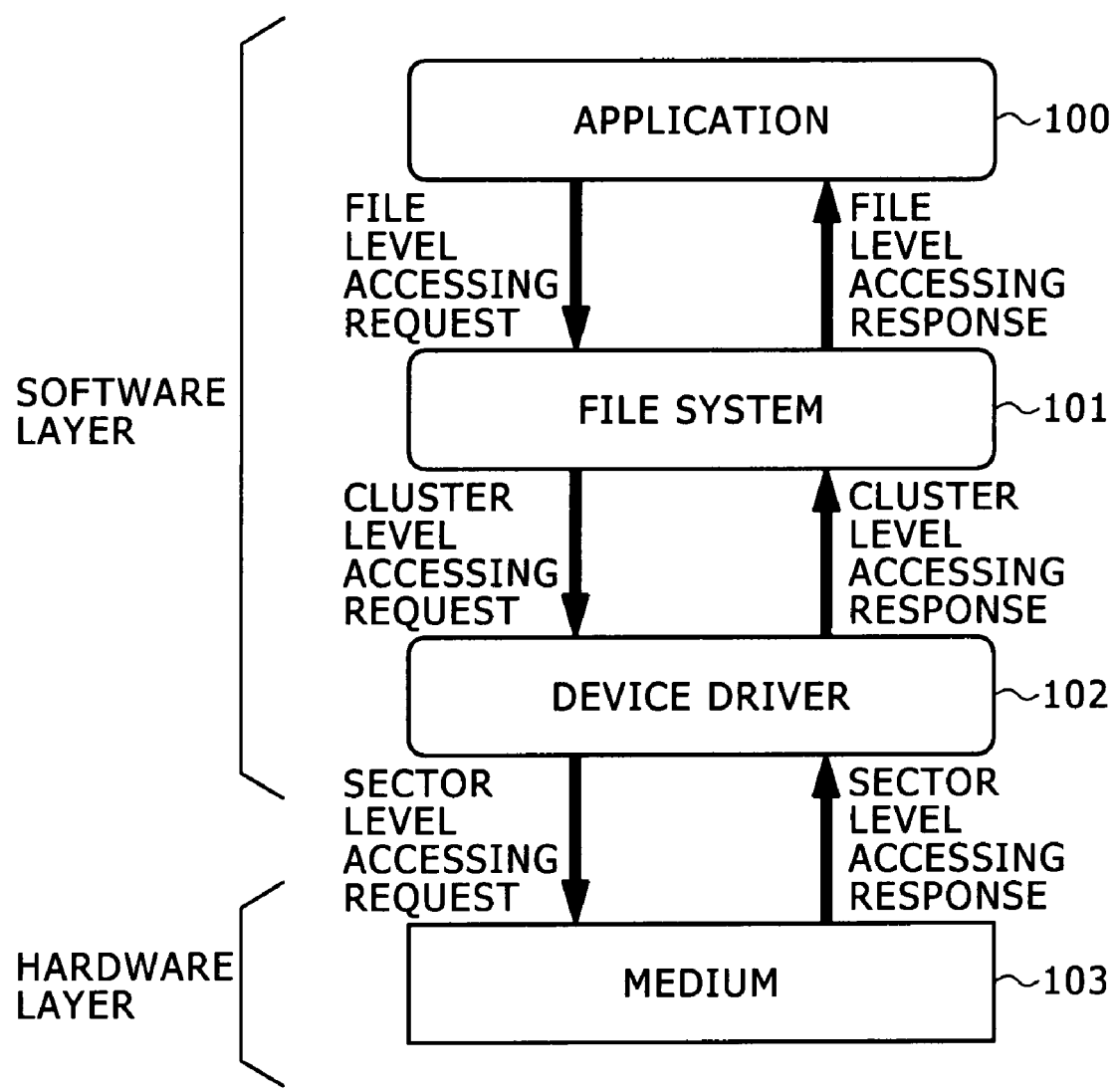
FIG. 2 is a block diagram showing a system configuration of a FAT file system used in the digital video camera as a layer model.

FIG. 2 illustrates a general system configuration of a FAT file system in a layer model.

Referring to FIG. 2, the layer model is roughly divided into a software layer and a hardware layer which underlies the software layer.

The software layer in this instance corresponds to software processing implemented by programs executed for a storage medium by a CPU of a host device (in the present embodiment, the digital video camera 1) and various pieces of firmware, middleware and so forth. The software layer in this instance includes an application 100, a file system 101 and a device driver 102 from the upper toward the lower layer side.

The hardware layer may be considered as a physical storage region of the storage medium itself.

The application 100 corresponds to application software which has, for example, recording/reproduction functions of a file and uses the storage medium, and issues an accessing request (or a data writing request) on the file level to the file system 101.

The file system 101 corresponds to software which implements a function as a file system. In the present embodiment, since the FAT file system is adopted, also the software which provides a function of the file system 101 is configured corresponding to the FAT file system.

The file system 101 converts an accessing request on the file level from the application 100 into an accessing request of the level of a cluster of a unit of management of data in the format of the FAT file system and provides the resulting accessing request to the device driver 102.

The device driver 102 corresponds to software for controlling the storage medium which is a device of a control object. The device driver 102 converts the accessing request based on the cluster level according to the FAT file system format from the file system 101 into an accessing request based on the level of a sector of a recording and reproduction unit of data on a medium 103, and provides the resulting accessing request to the medium 103.

The medium 103 in this instance is logically formatted (initialized) in accordance with the FAT file system. In FIG. 1, a storage medium or a storage device connected to the medium controller 13 such as a HDD, a recording medium of the optical disk type or a semiconductor storage device corresponds to the device driver 102 here. The medium 103 reads out data from a designated address in response to the accessing request on the sector level from the device driver 102 and returns the read out data to the device driver 102. In short, the medium 103 executes an access response on the sector level.

The device driver 102 receives an accessing request on the sector level from the medium 103, that is, receives data in a unit of a sector, and treats and passes the received data as data in a unit of a cluster to the file system 101 (access response on the cluster level).

The file system 101 passes the data received from the device driver 102 as data on the file level to the application 100. The application 100 executes a required process on the application level, for example, in response to an operation input by the user for the data received as a file.

Further, the FAT file system manages stored files in accordance with a tree type directory structure and manages each file as a set of cluster units. Such file management and data management as just mentioned are implemented by directory entries and table information called FAT as well known in the art. A directory entry is information indicating the location of a file or directory (sub directory) on the storage medium, and the FAT is information indicative of a chain (link or connection) on the cluster level which forms a directory or a file.

Figure 3:
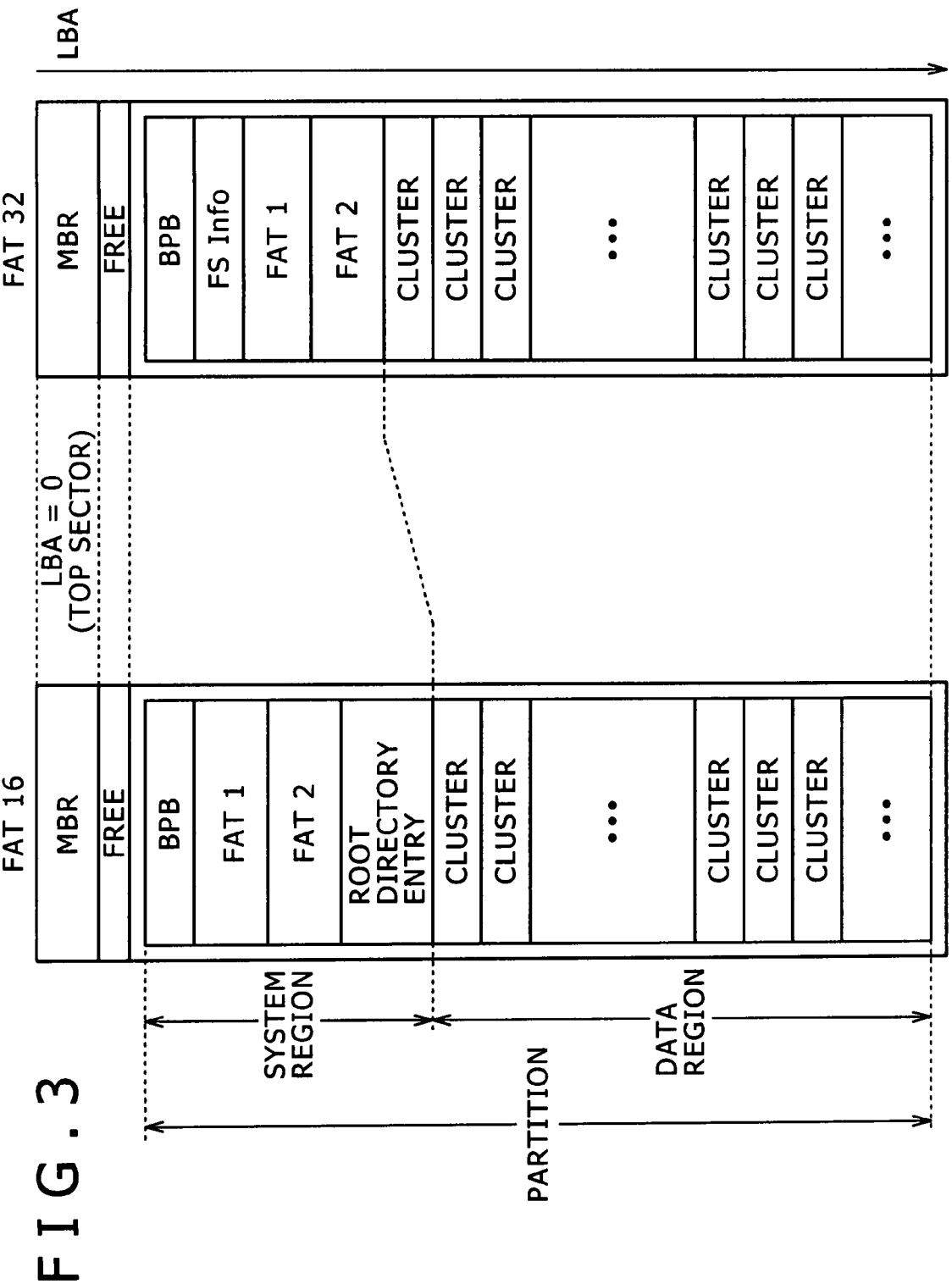
FIG. 3 is a view illustrating a format structure of a storage medium used in the FAT file system.

FIG. 3 shows a format structure of a storage medium according to the FAT standards.

While a plurality of FAT forms are prescribed, format structures corresponding to the FAT16 and FAT32 forms are shown in FIG. 3.

First, the format structure corresponding to the FAT16 form shown on the left side in FIG. 3 is described.

The structure shown is a logical one which conforms to LBA (Logical Block Addressing). In other words, the block (sector) number advances downwardly from the top sector (LBA=0) shown at the uppermost position in FIG. 3.

It is to be noted that, while, in the FAT file system, one physical storage region can be divided into a plurality of partitions, FIG. 3 shows the format structure where one physical storage region is composed of a single partition for the convenience of description.

First, the top sector represented by LBA=0 is used as a boot region called MBR (Master Boot Recorder).

Figure 4A:
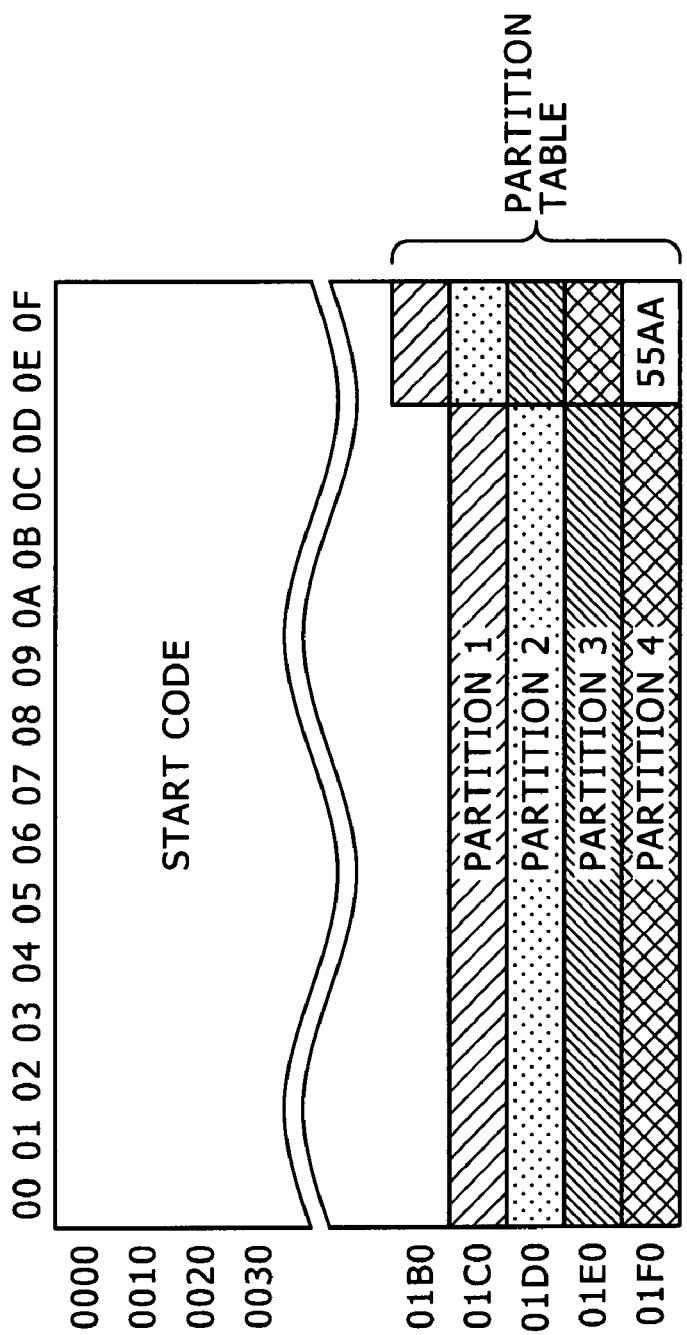
FIGS. 4A and 4B are diagrammatic views illustrating a structure of an MBR used in the FAT file system.

The structure of the MBR is illustrated in FIG. 4A.

Referring to FIG. 4A, one sector has a size of 512 bytes, and accordingly, the MBR has a size of 512 bytes. In FIG. 4A, 512 bytes of the region of the MBR are represented by hexadecimal numbers from 0000h to 01FFh, and a unit of 16 bytes is shown as a column. It is to be noted that, where a hexadecimal notation is used for representation, the character h representing the hexadecimal notation is added to the tail end of a numerical value such as 0000h and 01FFh as appearing as above.

The region of 446 bytes of the byte positions 0000h to 01BDh is used to place a code (start code) for starting (boot) where the storage medium is used as a medium for starting an OS (Operating System).

The region of 64 bytes of the byte positions 01BEh to 01FGh of the MBR is used as a partition table in which predetermined information relating to individual partitions required upon starting is placed. The region of the partition table is divided into four sub regions of 16 bytes which individually correspond to the partition 1, partition 2, partition 3 and partition 4. The sub regions corresponding to the partitions are used to place entries corresponding to the partitions.

In the last region of two bytes of the MBR, 55AAh is placed as an identifier representing that the sector is an MBR.

Figure 4B:
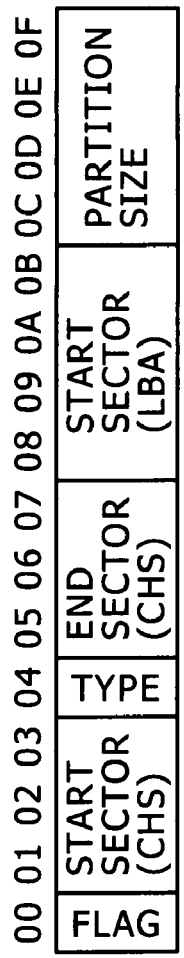

The entry of the partitions has a structure shown in FIG. 4B. Referring to FIG. 4B, the highest byte position 00h is used as a region in which a flag representing whether or not the partition is designated as a start drive is placed.

In the region of 3 bytes of the succeeding byte positions 01h to 03h, a value which represents the start sector of the partition as CHS (Cylinder/Head/Sector) is placed. In the region of 3 bytes of the byte positions 05h to 07h, a value which represents an end sector of the partition as CHS is placed.

In the region of 4 bytes of the byte positions 08h to 0Bh, a value which represents a start sector of the partition in the LBA is placed.

In the region of 4 bytes of the byte positions 0Ch to 0Fh, a value which represents the data size (partition size) of the partition is placed.

In the region of 1 byte represented by the byte position 04h, a value called system identifier which represents types of a platform, a file system and so forth to which the partition corresponds.

Referring back to FIG. 3, the top sector of the MBR is followed by a free region of a plurality sector number. A sector region following the free region forms a region for a unit of a partition.

The region of a predetermined byte number from the top sector in one partition is used as a system region in which information relating to the system is placed.

The region of a predetermined byte number beginning with the top sector in the system region is used as a BPB (BIOS Parameter Block/Boot Parameter Block). Here, required data to be utilized by the system for block device control, for example, like a BIOS (Basic Input/Output System) of the host side relating to the partition is placed in the BPB region. The information placed in the BPB includes the number of FAT regions which are described below, the start sector of a main one of the FAT regions and the sector number of each FAT region.

The BPB is followed by FAT regions of the FAT1 and the FAT2 in order. Usually, one of the regions of the FAT1 and the FAT2 is utilized as the main FAT region. The other FAT region is normally used as a mirror region whose substance is a copy of the substance of the main FAT region, and therefore is used, for example, as an extra region or a backup region for the main FAT region.

In the FAT regions, FAT entries are arrayed in order of the cluster number in the data region. The FAT entries and the clusters in the data region correspond in a one-by-one corresponding relationship to each other. In each of the FAT entries, in response to a storage result of a directory or a file, information representing one of the fact that the cluster is not used, a cluster number of a cluster to be chained next to the cluster in the file, a failed cluster, an EOF (End Of File: the last cluster in the file) and so forth is placed as information regarding the cluster.

In the FAT16 format, a cluster number is represented by two bytes (16 bits), and corresponding to this, also the size of each FAT entries is two bytes.

The regions of the FAT 1 and the FAT 2 are followed by a root directory entry of a predetermined size. A directory entry regarding a directory, a file or the like of the root directory is placed in the root directory entry.

A sector region on the lower order side from the root directory forms a data region. Writing/reading out of data into/from the data region is managed by the FAT file system. Accordingly, in the format structure of the file system, the data region is managed in a unit of a cluster formed from a concatenation of a predetermined number of sectors equal to or greater than one as seen in FIG. 3. As described hereinabove, each of the FAT regions in principle has FAT entries corresponding to all clusters which form the data region.

Now, the format structure corresponding to the FAT32 shown on the right side in FIG. 3 is described.

Also in the format structure for the FAT32, the MBR is placed in the top sector represented by LBA=0. The MBR is followed by a free region of a predetermined sector number, which is in turn followed by regions of partition units.

As a system region in the partition regions of the format structure for the FAT32, a region for FSinfo is provided next to the BPB region.

In the FSinfo region, predetermined information to be utilized for calculation of a free capacity of the partition is placed. The FAT regions of the FAT1 and the FAT2 are disposed successively following the FSinfo region.

Also in the FAT regions of the FAT32 format, FAT entries which corresponding in a one-by-one corresponding relationship to the clusters are arrayed in the order of the cluster number. In each FAT entry, predetermined information regarding the cluster is placed in response to a result of storage of a directory or a file. However, in the FAT32 format, the cluster number is represented by four bytes (32 bits), and therefore, also the size of the FAT entries is four bytes.

Further, the format structure of the FAT32 does not include the region for a root directory entry provided in the system region in the format structure of the FAT16.

In the format structure of the FAT32, the root directory is placed in the data region. The start cluster number of the root directory in the data region is indicated by a value placed in a predetermined region (RootClus) of the BPB, and in order to access the root directory, the RootClus region is referred to and the cluster number recognized from the RootClus region is accessed. The start cluster number of the root directory indicated by the RootClus region usually is 2.

The data region also in this instance is managed by the file system of the FAT32 so that writing/reading out of data into/from the same is performed in a unit of a cluster.

Figure 5:
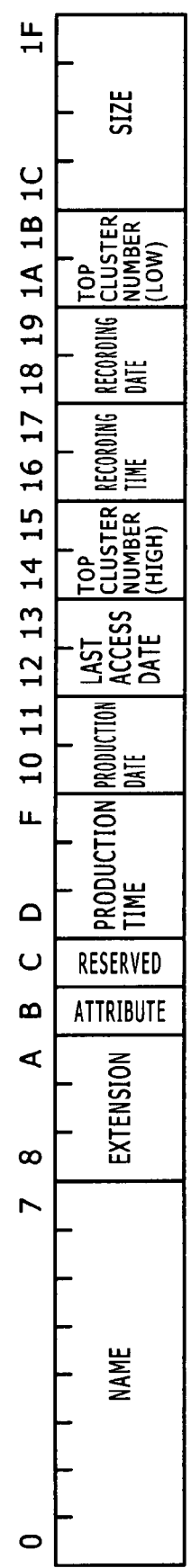
FIG. 5 is a diagrammatic view showing a structure of a directory entry in the FAT file system.

FIG. 5 illustrates the structure of the directory entry defined by the FAT file system. It is to be noted that FIG. 5 actually illustrates the structure of the directory entry corresponding to the FAT32.

In this instance, the directory entry has a size of 32 bytes. In FIG. 5, the byte positions from the highest order byte to the lowest order byte are indicated by values from 0h to 1Fh.

In the 32 bytes which form the directory entry, the region of 8 bytes from the highest order byte position 0h to the byte position 7h is used to place the name of a file or a directory indicated by the directory entry.

In the region of 3 bytes from the succeeding byte position 8h to the byte position Ah, an extension corresponding to the file formation of the file is placed.

At the succeeding byte position Bh, a value indicative of an attribute of the present file/directory is placed.

The byte position Ch here is used as a reserved region.

In the region of three bytes of the byte positions Dh to Fh, a value indicative of the time of production of the file/directory is placed.

In the region of two bytes of the byte positions 10h to 11h, a value of the date of production of the file/directory is placed.

In the region of two bytes of the byte positions 12h to 13h, a value representative of the date (last access date) at which accessing to the file/directory was performed last.

The region of totaling four bytes including the 2-byte region of the byte positions 14h to 15h and the 2-byte region of the byte positions 1Ah to 1Bh indicates the cluster number of the top position of the storage medium on which the file/directory is stored. In other words, the value of the top cluster number of the file/directory is placed in this region of totaling four bytes. In the 2-byte region of the byte positions 14h to 15h, the value of higher order four bytes of the top cluster number is placed. In the 4-byte region of the byte positions 1Ah to 1Bh, the value of the lower order four bytes of the top cluster number is placed.

In the 2-byte region of the byte positions 16h to 17h, a value representative of the time (recording time) at which recording (last updating) was executed for the file/directory is placed.

In the 2-byte region of the byte positions 18h to 19h, a value representative of the date (recording date) on which the recording (last updating) was executed for the file/directory is placed.

In the region of four bytes at the byte positions 1Ch to 1Fh, a value representative of the size (capacity) of the file/directory is placed.

FIGS. 6A to 6I illustrate an example of file management by the FAT file system. It is to be noted that, in FIGS. 6A to 6I, files are formatted in accordance with the FAT32.

At least a file A, another file B, a further file C and a still further file D are placed in the data region, and the directory entries of the files A, B, C and D are illustrated in FIGS. 6A to 6D, respectively. It is to be noted that, in the following description given with reference to FIGS. 6A to 6I, since it is given principally regarding information of the top cluster number (byte positions 14h to 15h/1Ah to 1Bh) in the directory entries, information of the other regions is omitted occasionally.

Figure 6:
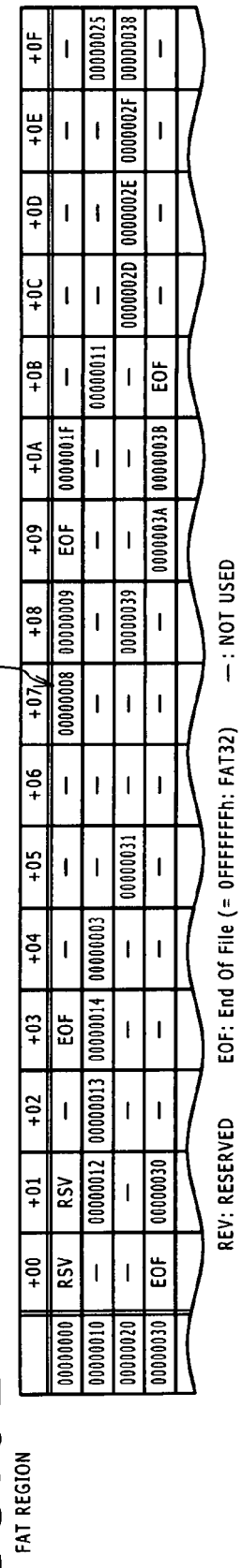
FIGS. 6A to 6I are diagrammatic views illustrating an example of management of the file recording position by the FAT file system.

FIG. 6E illustrates part of a FAT region and has the substances of the FAT entries corresponding to results of storage of the files A, B, C and D. It is to be noted that, in FIG. 6E, only the FAT entry substances almost corresponding to the files A, B, C and D are illustrated selectively so that they can be recognized easily. Further, as described hereinabove, in the FAT32, each FAT entry has a size of 32 bits.

Further, the FAT entries in the FAT region illustrated in FIG. 6E are arranged in a matrix including rows in which the value of the cluster number corresponding to the FAT entry is incremented for each one column as indicated as 00000000h, 00000010h, 00000020h, 00000030h, . . . and columns in which +00h~+0Fh which are values of the lowermost columns each of which is to be added to the value of the cluster number indicated by the corresponding row. For example, the FAT entry at the position at which the row of 00000000h and the column of +07h corresponds to the cluster number 00000007h.

In the FAT file system, the two clusters including the top cluster and the succeeding second cluster represented by the cluster numbers 00000000h and 00000001h, respectively, are reserved regions (RSV). In a corresponding relationship to this, also the FAT entries corresponding to the cluster numbers 00000000h and 00000001h are prescribed as reserved regions.

Further, as a value to be placed in each of the FAT entries, the cluster number to be chained next to the current cluster is represented by one of 00000002h~0FFFFFF6h. Further, the EOF (last cluster of the file) including the cluster (last end cluster of the file) is represented by EOF=0FFFFFFFh. Further, while, in FIG. 6E, each unused cluster is represented by "-", it is actually represented, for example, by the value of 00000000h.

In order to access the file A, the directory entry of the file A illustrated in FIG. 6A is accessed first. The accessing to the directory entry itself of the file A is performed, for example, in the following manner.

A case wherein a command for file accessing relies upon an absolute path is taken as an example. In this instance, in order to access the directory entry of the file A, the root directory is accessed first, and directory entries are traced along the path from the root directory. Further, while a sub directory of a certain current directory is sometimes passed in a process while directory entries are traced, also the parent-child relationship between a parent directory and a child directory is represented by a directory entry. To this end, for example, a name representative of a child directory is provided in the directory entry of the parent directory side while a directory entry wherein information representative of the presence of the parent directory is placed in the name region is provided in the directory entry of the child directory indicated by the directory entry of the parent directory side. Consequently, the directories can be traced bidirectionally from the parent to the child and from the child to the parent.

Then, as a result of the tracing of directory entries in accordance with the path in such a manner as described above, the directory entry of the file A can be reached finally as the access destination.

After the accessing to the directory entry of the file A is performed, accessing to the file A itself is performed using the directory entry of the file A as a start point.

The accessing to the file A itself is performed in the following manner as a concept.

In order to access the file A, the top (start) cluster number of the directory entry of the file A is acquired. The top cluster number indicates the start cluster number in which data of the file A is stored in the data region, and in this instance, is 00000007h as seen in FIG. 6A. In other words, at this stage, it is recognized that the start cluster number of the file A is 00000007h.

Therefore, the file system accesses the FAT entry corresponding to the cluster number 00000007h in the FAT region illustrated in FIG. 6E to refer to the value placed in the FAT entry. In this instance, 00000008h is placed in the FAT entry corresponding to the cluster number 00000007h. Consequently, the file system recognizes that, in the data of the file A, the data of the cluster of the cluster number 00000007h is followed by data of the cluster of the cluster number 00000008h. Thus, the file system now accesses and refers to the FAT entry corresponding to the cluster number 00000008h. Since 00000009h is placed in the FAT entry thus referred to, the file system recognizes that, in the data of the file A, the data of the cluster of the cluster number 00000008h is followed by data of the cluster of the cluster number 00000009h. Thus, the file system now refers to the FAT entry of the cluster number 00000009h. Since the value representative of the EOF is placed in the FAT entry referred to, the file system recognizes that the last end of the file A is the cluster of the cluster number 00000009h.

From this, it is recognized that the file A is formed from a concatenation of data of the clusters of the cluster numbers 00000007h to 00000009h as seen from a cluster chain of FIG. 6F. The file system successively accesses the clusters of the cluster numbers 00000007h to 00000009h thereby to access the file A.

As can be recognized from the foregoing description, the position of data of a file stored in the data region is indicated by a top cluster number placed in the directory entry and the substance of FAT entries of the FAT region to be referred to from a start point given by the top cluster number. Thus, the file system can access the file by referring to the information of the top cluster number and the substance of the FAT entries.

Also it can be recognized that management of files stored in the data region which depend upon the tree-type directory structure is represented by the directory entries.

The stored positions of the remaining files B, C and D are managed in the following manner based on file management information including the directory entries and the FAT region.

First, as regards the file B, the cluster number of the top (start) cluster is 0000000Ah as seen from the directory entry of FIG. 6B. Thus, if the FAT entry corresponding to the cluster number 0000000Ah of the FAT region illustrated in FIG. 6E is referred to, then in the FAT entry, the cluster number 0000001Fh is placed as chain information representative of the next cluster. Thus, if the FAT entry is traced to refer to the FAT entry corresponding to the cluster number 0000001Fh, then the cluster number 00000025h is placed as chain information. In the FAT entry corresponding to the cluster number 00000025h, the cluster number 00000031h is placed. In the FAT entry corresponding to the cluster number 00000031h, the cluster number 00000030h is placed. In the FAT entry corresponding to the cluster number 00000030h, the value representative of the EOF is placed.

In this manner, it is represented by the directory entries and the FAT region that the file B is formed from a concatenation of data stored in the clusters of the cluster numbers 0000000Ah, 0000001Fh, 00000025h, 00000031h and 00000030h traced in order as seen in FIG. 6G.

Meanwhile, as regards the file C, the cluster number 0000001Bh is indicated as the top (start) cluster in the directory entry of the file C as seen in FIG. 6C. Thus, FAT entries are successively referred to from a start point given by the FAT entry of the cluster number 0000001Bh in the FAT region illustrated in FIG. 6E. As a result, the file C is formed from a concatenation of data stored in the clusters of the cluster numbers 0000001Bh, 0000001h, 00000012h, 00000013h, 00000014h and 00000003h traced in order as seen in FIG. 6H.

Further, as regards the file D, the cluster number 0000002Ch is indicated as the top (start) cluster of the file in the directory entry of the file D as seen in FIG. 6D. Thus, FAT entries are successively referred to from a start point given by the FAT entry of the cluster number 0000002Ch in the FAT region illustrated in FIG. 6E. As a result, the file D is formed from a concatenation of data stored in the clusters of the cluster numbers 0000002Ch, 0000002Dh, 0000002Eh, 0000002Fh, 00000038h, 00000039h, 0000003Ah and 0000003Bh traced in order as seen in FIG. 6I.

In the following, the background to the present invention is described first on the ground of the substance of the format of the FAT file system described above.

According to the foregoing description, the digital video camera 1 of the present embodiment can record video data of moving pictures and still pictures obtained by image pickup and audio data on a storage medium which may be, for example, a HDD. The data recorded on the HDD are managed in a unit of a file by an adopted file system, and in the present embodiment, the FAT file system is adopted as the file system.

Figure 7:
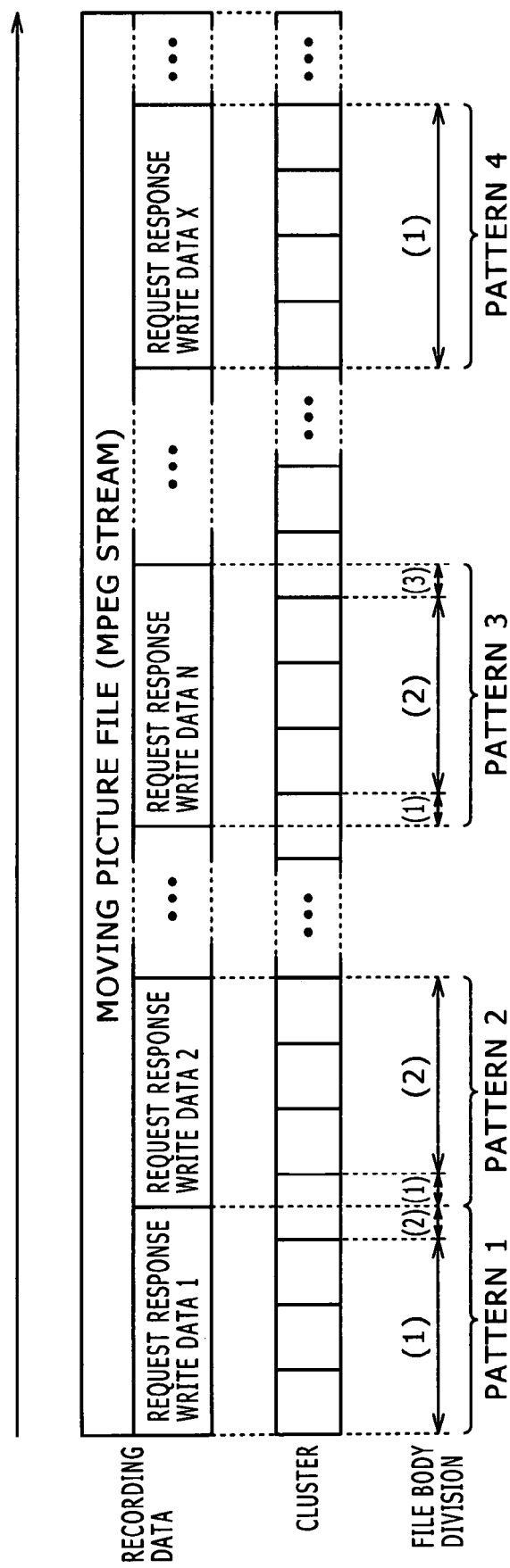
FIG. 7 is a diagrammatic view illustrating an example of a relationship between recording data and sectors where a moving picture file of the MPEG stream format is recorded on a storage medium which is managed by the FAT file system.

Thus, an example of a written state of recording data where the storage region of the HDD is considered as a concatenation of cluster units when a moving picture file is recorded on the HDD by the digital video camera 1 of the present embodiment is illustrated in FIG. 7.

Referring to FIG. 7, data of one moving picture file to be recorded on the HDD under the control of the FAT file system are illustrated as a concatenation of request response write data. The request response write data illustrated in FIG. 7 are such as follows.

The format of a moving picture file picked up and recorded by the digital video camera 1 complies with an MPEG system such as the MPEG2 or MPEG4 system. Thus, in the digital video camera 1 having the configuration described hereinabove with reference to FIG. 1, for example, the video signal processing section 4 has a configuration section which can execute a compression coding process ready for the MPEG system for video and audio signals inputted thereto. Further, the video signal processing section 4 includes a buffer (for example, of a ring buffer type) for temporarily storing data produced by the compression coding process.

The video signal processing section 4 accumulates compression coded data in response to the progress of the compression coding process. Then, as a function of the application 100 which is implemented, for example, by the CPU 10 executing a program of the system of FIG. 2, when the accumulated amount of data in the buffer exceeds a fixed level, a request (data writing request) for reading out the collected data of a certain size from the buffer and writing and recording the data on the HDD is issued to the file system 101. Each of the request response write data illustrated in FIG. 7 is a unit of data passed from the application 100 to the file system 101 so as to be recorded on the HDD in response to one data writing request in this manner.

The file system 101 controls the device driver 102 to write and record request response write data passed thereto together with each data writing request from the application 100 on the HDD (storage medium) at a timing of the data writing request in such a manner as described hereinabove with reference to FIG. 2. Then, the writing of one moving picture file on the HDD is completed with ending of the writing of the request response write data at the last end of the file.

Figure 9:
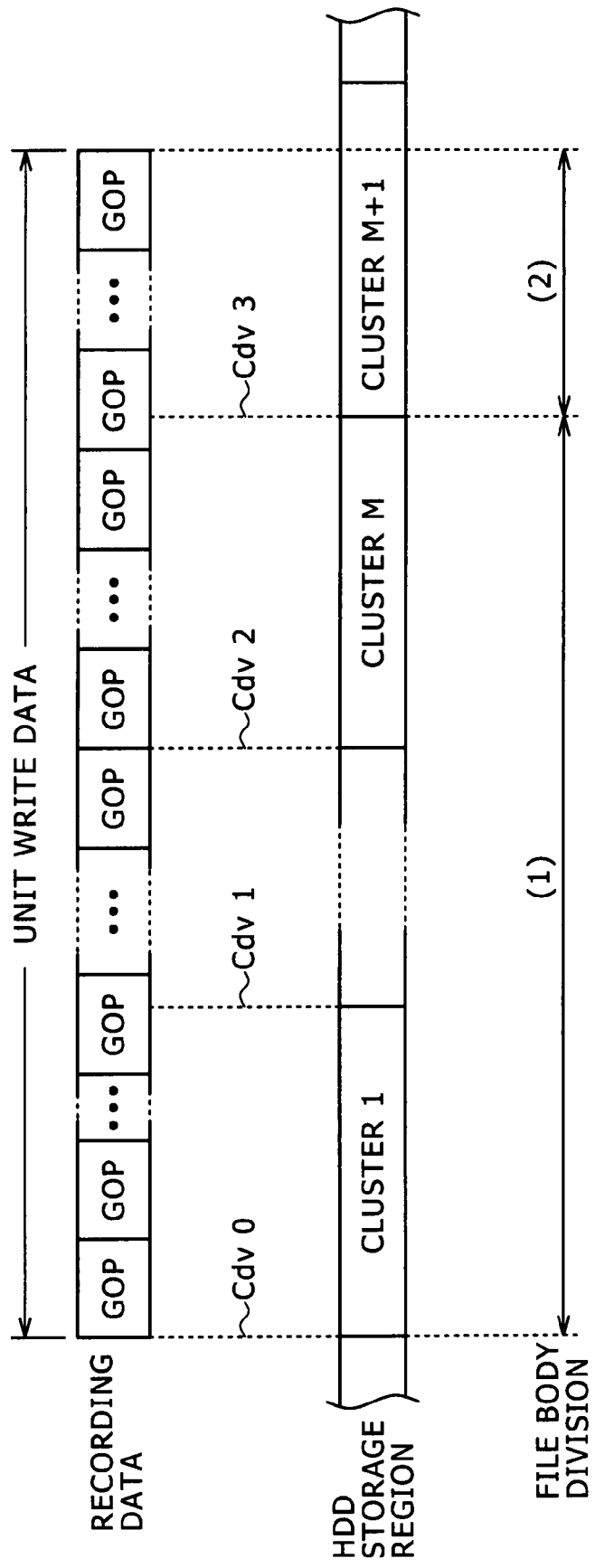
FIG. 9 is a diagrammatic view illustrating a corresponding relationship between request response write data formed from a concatenation of GOPs and sectors where the request response write data is recorded on a medium managed by the FAT file system.

Further, since the request response write data in this instance is data compression coded in accordance with the MPEG system, it is formed as a concatenation of one or more GOPs (Groups of Pictures) as seen on the upper stage of FIG. 9. A GOP is formed including image data complete as one frame picture called I picture and data of B pictures and a P picture or pictures necessary in accordance with the substance of the image as well known in the art, and has a significance as a minimum data unit for allowing a decoding process upon reproduction to be performed completely. Further, the size of the GOP differs depending upon the substance and so forth of encoded images. Accordingly, also the request response write data is unit data not of a fixed length but of a variable length. Further, the request response write data is handled, for example, on the layer level of the application 100, and in this connection, matching with the size of the cluster (unit region) managed by the file system is not particularly taken into consideration. For the confirmation, the cluster is defined so as to have a predetermined fixed length determined, for example, in accordance with the size of the sector.

Since the request response write data has a variable length and has no particular relationship to the size of the cluster, where the size of the request response write data is greater than the size of the cluster, the request response write data size is not necessarily equal to an integral number of times the cluster size.

The example of the recording result of moving picture files illustrated in FIG. 7 is described based on the foregoing description. First, since the first request response write data 1 is the top data of the moving picture file, it is written into a cluster beginning with the top position of the cluster (naturally, the data writing control may be performed such that writing of the top of a file is started from an intermediate portion of a cluster). The request response write data 1 is written into totaling four clusters, and the end position of the request response write data 1 written in the last or fourth cluster is an intermediate position of the cluster.

The next request response write data 2 begins to be written continuously to the end position of the request response write data 1. In other words, since each request response write data is a data portion which composes one file at all, when the end position of the preceding request response write data is an intermediate position of a cluster, writing of the succeeding request response write data is started from the end position of the preceding request response write data so as to fill up the cluster without starting writing of the succeeding request response write data from the top of another cluster. It is to be noted that, in this instance, the end position of the optical system section 2 coincides with the last end of a cluster. Thereafter, writing of the request response write data is successively executed such that a cluster is filled up in such a manner as described above every time a data writing request is issued. It is to be noted that the clusters shown in FIG. 7 are logically connected to each other by a cluster chain described hereinabove.

As can be recognized from the foregoing description, where a moving picture file recorded on the storage medium (HDD) is viewed on the level of request response write data, in the relationship to the FAT file system, the boundary between adjacent request response write data does not necessarily coincides with a boundary between adjacent clusters.

Then, where the size of one request response write data is greater than the size of one cluster, as a result of use of a cluster in which request response write data is written, four patterns are available which correspond to the request response write data 1, 2, N and X of FIG. 7 and are indicated as patterns 1 to 4 in FIG. 8.

In particular, in the pattern 1, the start position of the request response write data is the top of a cluster, and the end position of the request response write data is an intermediate position of another cluster.

In the pattern 2, the start position of the request response write data is an intermediate portion of a cluster, and the end position of the request response write data is the last end of another cluster.

In the pattern 3, the start position of the request response write data is an intermediate portion of a cluster, and also the end position of the request response write data is an intermediate portion of another cluster.

In the pattern 4, the start position of the request response write data is the top of a cluster, and the end position of the request response write data is the last end of another cluster.

Then, when the file system controls writing of request response write data, it subdivides the request response write data into data processing units conforming to the level layer of the file system in response to the four patterns relating to results of use of the clusters described above. The data processing unit is hereinafter referred to as file body.

The file body is formed from a data portion of request response write data to be placed in a cluster where the start position or the end position of the request response write data is an intermediate portion of the cluster. Or, the file body is formed from a data portion of request response write data to be placed in one or more clusters connected to each other where only the same data portion of the request response write data is placed. The former file body is hereinafter referred to as incomplete type file body because it is a data portion smaller than one cluster, and the latter file body is hereinafter referred to as fully placed file body because the data is placed fully in more than one cluster.

For example, as regards the request response write data 1 illustrated in FIG. 7, the start position coincides with a start position of a cluster and the end position is an intermediate portion of another cluster. Therefore, the request response write data 1 is divided into two file bodies including a preceding file body (1) and a succeeding file body (2). In this instance, the file body (1) is of the fully placed type and the file body (2) is of the incomplete type. It is to be noted that a numerical value in parentheses regarding a file body indicates a logical order of arrangement of the file body in the request response write data.

Meanwhile, as regards the request response write data 2, the start position is an intermediate portion of a cluster and the end position coincides with the last end (cluster boundary) of another cluster. Therefore, the request response write data 2 is divided into a file body (1) of the incomplete type and another file body (2) of the fully placed type.

As regards the request response write data 3, both of the start position and the end position are intermediate portions of different clusters. Therefore, the request response write data is divided into three file bodies including a file body (1) of the incomplete type, another file body (2) of the fully placed type, and a further file body (3) of the incomplete type.

The request response write data 4 is composed only of a file body (1) of the fully placed type because both of the start position and the end position correspond to the boundaries of clusters.

Figure 10:
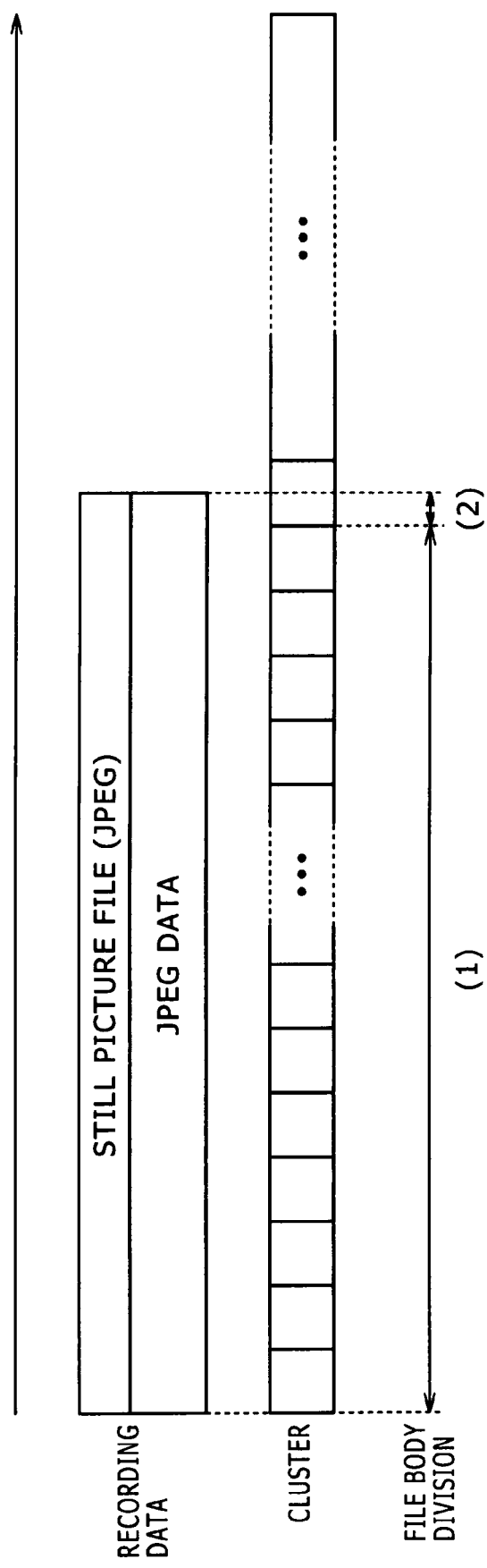
FIG. 10 is a diagrammatic view illustrating a corresponding relationship between request response write data as a still picture file (JPEG format) and sectors where the request response write data are recorded on a storage medium managed by the FAT file system.

FIG. 10 illustrates an example of a written state of recording data where the storage region of the HDD is viewed in cluster units when a still picture file is recorded on the storage medium (HDD). It is to be noted that the still picture file illustrated in FIG. 10 is of the JPEG format. In a corresponding relationship to this, the still picture processing section, for example, of the video signal processing section 4 of the digital video camera 1 of the present embodiment should be configured such that it can perform encoding and decoding processes and so forth ready for the JPEG format.

Also a still picture file itself, for example, of the JPEG system has a size variable in response to the resolution, the substance of images or the like, and also the relationship of the size to the size of clusters of the file system side is not particularly taken into consideration. Further, as regards a still picture file obtained by image pickup, all data of the still picture file are written into a storage medium in accordance with one data writing request. In short, entire data of a still picture file form one request response write data.

Then, where the size of a certain still picture file is not equal to an integral number of times the cluster size, the still picture file is divided, for example, into a file body (1) of the fully placed type which begins with the data start position of the file and a succeeding file body (2) of the incomplete type as seen in FIG. 10.

Further, though not shown in FIG. 10, if the size of a still picture file is equal to an integral number of times the cluster size, then it is considered that the still picture file is composed of one file body of the fully placed type as described hereinabove with reference to FIG. 7.

Further, if the data writing control is such that the start position of a file can be set to an intermediate portion of a cluster, then a pattern wherein the file is divided into a file body (1) of the incomplete type and a succeeding file body (2) of the fully placed type and another pattern wherein a file body (1) of the incomplete type, another succeeding file body (2) of the fully placed type and a further succeeding file body (3) of the incomplete type are added.

Figure 11:
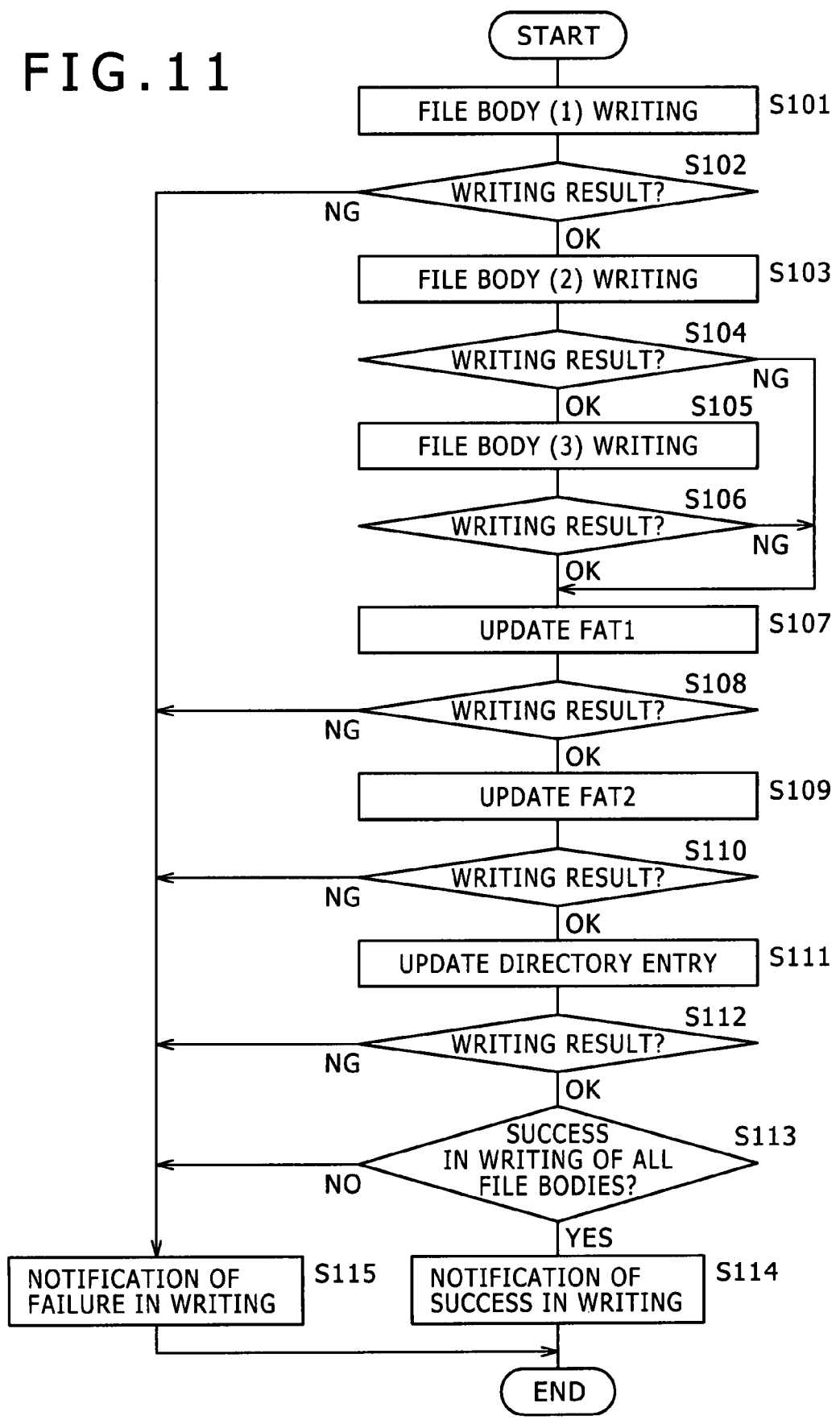
FIG. 11 is a flow chart illustrating an example of a procedure for writing request response write data on a storage medium where the FAT file system is adopted.

Then, such division of a file body of object request response write data as described above is performed assuming such data writing control as illustrated in FIG. 11, for example, by the FAT file system. The flow chart of FIG. 11 illustrates an example of a control procedure when request response write data of the pattern 3 illustrated as the request response write data N in FIG. 7 is written into a storage medium.

For example, if the file system receives a data writing request from an application of the higher order processing layer, then it decides based on the size and so forth of new request response write data passed thereto together with the request and a result of data writing till then which one of the cluster use result patterns 1 to 4 a result when the new request response write data is written into the storage medium exhibits. Then, if a result of the decision is the pattern 3, then the file system executes the process illustrated in FIG. 11.

As described hereinabove, the request response write data of the pattern 3 is divided into a file body (1) of the incomplete type, another file body (2) of the fully placed type and a further file body (3) of the incomplete type. Therefore, the file system executes, at step S101 of FIG. 11, control for writing the file body (1). Then at next step S102, it is decided whether a result of the writing of the file body (1) at step S101 results in success (OK) or failure (NG). For example, while a lower order device driver is controlled as the data writing control of the file system, the device driver returns a response representing whether a result of execution of data writing into a storage medium in response to data writing demanded from the file system is OK or NG. The decision process at step S102 is performed based on information of the data writing result returned from the device driver. It is to be noted that this similarly applies to decision between OK and NG regarding a result of later data writing or a result of data writing for updating of management information (FAT, directory entry).

If it is decided at step S102 that the data writing result is NG, then the processing advances to step S115. At step S115, a process for notifying, for example, a higher order application or the like that the data writing results in failure (NG) is executed. For example, if the application is notified of failure in data writing at step S115, then it executes a predetermined error coping process such as to compulsorily end the writing of the file or, if possible, to re-write (attempt to write again) the file.

It is to be noted that, for example, if the process of compulsorily ending the recording of the file is executed as the error coping process of the application in response to the notification at step S115, then a notification of this is preferably issued as an error message or the like to the user. This is because, only if the recording operation is merely ended compulsorily without outputting an error message, then there is the possibility that the user may be confused inadvertently.

Figure 13:
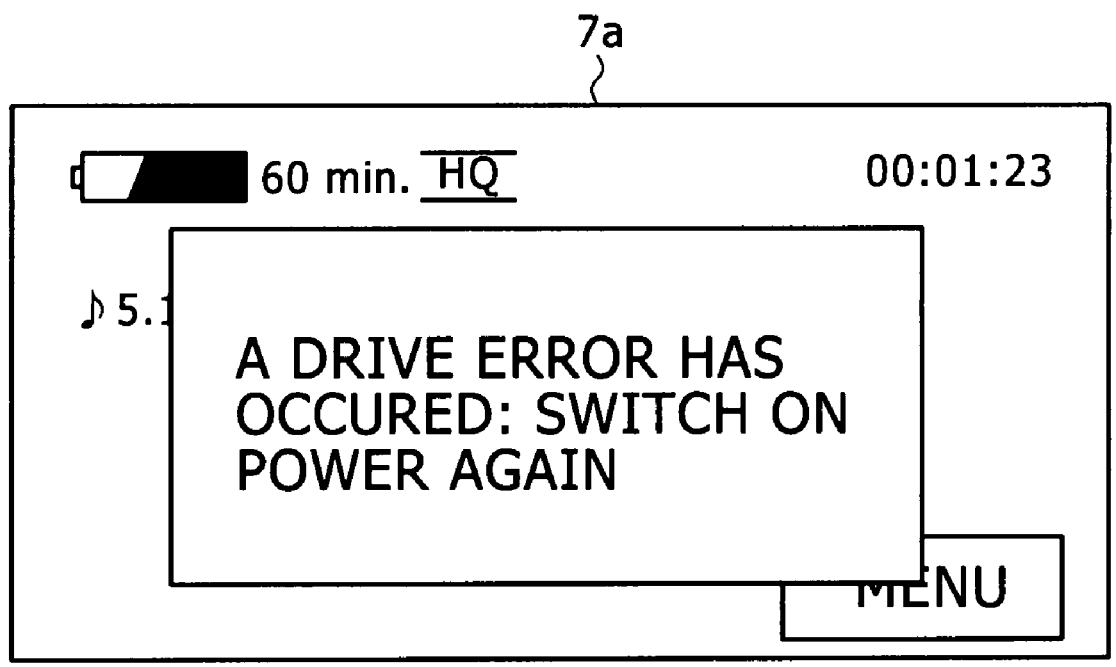
FIG. 13 is a schematic view showing an example of a form of an error message to be displayed when the digital video camera fails to writing request response write data.

While an output form of an error message may be given, for example, as a display image or sound, an example of the form where an error message is outputted as a display image on the display section 7 is shown in FIG. 13.

In the error message illustrated in FIG. 13, an error message "A drive error has occurred: switch on power again" which is a representation to a user is displayed on a display screen section 7a of the display section 7.

Referring back to FIG. 11, if a writing result of OK is obtained at step S102, then the processing advances to step S103, at which control for writing the file body (2) is executed. Then at step S104, it is decided whether a result of the writing of the file body (2) at step S103 is OK or NG.

If the decision result at step S104 is OK, then the processing advances to step S105, at which control for writing the file body (3) is executed. However, if a decision result of NG is obtained at step S104, then a procedure for updating the file management information (FAT, directory entry) at step S107 et seq. is executed. It is to be noted that the procedure at steps S107 et seq. is hereinafter described.

Also when the write control of the file body (3) at step S105 is executed, it is decided at step S106 whether a result of the writing of the file body (3) at step S105 is OK or NG.

It is to be noted that, while, in the flow of FIG. 11, the procedure for updating the management information at step S107 et seq. is executed irrespective of whether the decision result at step S106 is OK or NG, the substance of the management information to be updated at step S107 et seq. differs depending upon whether the decision result at step S106 is OK or NG.

At step S107, data writing control for updating the substance of the FAT1 region is executed in response to the results of writing of the file bodies till now. As described hereinabove with reference to FIG. 3, the FAT which is file management information to be utilized by the FAT file system includes two FAT regions FAT1 and FAT2. At step S107, updating is performed for the FAT1 region from between the FAT1 and FAT2 regions. Then at next step S108, it is decided whether a result of the data writing as the updating of the FAT1 region at step S106 is OK or NG. If the data writing result is OK, then the processing advances to step S109. On the other hand, if the data writing result is NG, then the processing advances to step S115, at which a notification of failure in writing is issued.

At step S109, data writing control for updating the FAT2 region is executed. Then at step S110, it is decided whether or not a result of the data writing is OK or NG. If the data writing result is OK, then the processing advances to step S111, but if the data writing result is NG, then the processing advances to step S115.

At step S111, data writing control for updating the directory entry which forms the file management information of the FAT file system together with the table information of the FAT region is executed. Then at next step S112, decision of a result of the writing is performed. If a decision result of OK is obtained at step S112, then the processing advances to step S113, but if another decision result of NG is obtained, then the processing advances to step S115.

At step S113, it is decided whether or not the writing of data of all of the three file bodies (1), (2) and (3) results in success (OK) as a result of execution of the procedure till now is OK. Then, if an affirmative decision result is obtained, then a notification that the writing of the request response write data results in success (OK) is issued to the higher order application at step S114. For example, if there remains data to be recorded, then the application receiving the notification continues the control to successively record the remaining data on the storage medium.

Incidentally, the updating process for the file management information at steps S107 to S111 is started in three cases including a case wherein a decision result of NG is obtained at step S104, another case wherein a decision result of NG is obtained at step S106 and a further case wherein another decision result of OK is obtained at step S106.

First, the case wherein a decision result of NG is obtained at step S104 is a case wherein the writing of the file body (2) at step S103 results in failure although the writing of the file body (1) at step S101 results in success. Thereafter, the updating process for file management information at steps S107 to S111 is performed such that the file management information is updated so that only a result of the writing of the file body (1) is reflected. Further, since the decision at step S113 corresponding to this case is negative, a notification of failure in writing of request response write data is issued at step S115.

Meanwhile, the case wherein a decision result of NG is obtained at step S106 is a case wherein the writing of the file body (3) at step S105 results in failure although the writing of the file body (1) at step S101 and the writing of the file body (2) at step S103 result in success. Therefore, at steps S107 to S111 in this instance, updating of the file management information for causing the results of the writing of the file bodies (1) and (2) to be reflected is performed. Also in this instance, the result of decision at step S113 is negative, and a notification of failure in writing at step S115 is issued.

Then, if a result of decision of OK is obtained at step S106, then this signifies that writing of all of the file bodies (1), (2) and (3) results in success. Therefore, at steps S107 to S111, updating of the file management information for causing the results of writing of the file bodies (1), (2) and (3) to be reflected is performed. In this instance, since an affirmative decision result is obtained at step S113, a notification of success in writing is issued at step S114.

It is considered that, according to such a procedure as described above, the file management information is updated so that the writing result is reflected. The file bodies in this instance are unit data formed by partitioning request response write data which is a writing data unit to be processed on the file level by an application using a cluster as a boundary so as to be ready for writing control of the FAT file system. Accordingly, if the control procedure is configured such that the file management information is updated successively every time writing of a file body results in success, then data whose writing results in success can be placed into a state wherein they can be managed without leaving any data in a unit of a cluster managed by the FAT file system. Originally, this is considered natural and reasonable.

For example, where the FAT file system is adopted under a popular computer system, such a procedure for data writing control as illustrated in FIG. 11 does not particularly have a problem and is effective correspondingly. However, for example, where the digital video camera 1 of the present embodiment is compared with a popular computer system, most of files to be recorded on the storage medium (HDD) have a form of stream data (more particularly, a compression coded form) of moving pictures, and the digital video camera 1 is portable and is driven by a battery. Therefore, the digital video camera 1 has such a special circumstance that it is difficult to exclude the possibility that recording may be interrupted improperly by an inadvertent operation or the like. Where this is taken into consideration, for example, such a writing control procedure of request response write data as described hereinabove with reference to FIG. 11 suffers from such a disadvantage as described below.

Also here, a moving picture file of a form compression coded by the MPEG system is described as an example.

A moving picture file according to the MPEG system is formed from a sequence (concatenation) of GOP (Group Of Pictures) units as described hereinabove.

Corresponding to this, also the structure of request response write data is formed from a sequence of GOPs as illustrated as recording data in FIG. 9. In particular, when a moving picture file is to be recorded, every time recording data of a GOP unit is formed by the compression coding process of the video signal processing section 4, the higher order application of the file system writes the recording data into the buffer to accumulate the recording data. Then, when the accumulated state becomes such that the collection of data of the sequence of GOP units has a size exceeding a fixed size, the data of the sequence of GOP units of the collection are read out as request response write data and passed to the file system.

Request response write data is formed from a concatenation of a certain number of GOPs in this manner. Accordingly, it can be recognized that the request response write data has a variable length and does not have a particular relationship to the size of clusters as described hereinabove.

This signifies that a boundary between GOPs which form the request response write data does not necessarily coincide with a boundary between clusters formed on the storage medium. Accordingly, this also indicates that a GOP may possibly be divided by a boundary between clusters. This is confirmed with reference to FIG. 9.

In the example of FIG. 9, since writing data of request response write data is started from the top of the cluster 1, the writing start position of the request response write data coincides with a cluster boundary Cdv0 corresponding to the top of the cluster 1. However, another cluster boundary Cdv1 in the request response write data is positioned intermediately of a GOP of the request response write data. In other words, at the position of the cluster boundary Cdv1, a cluster boundary and a GOP boundary do not coincide with each other. Further, while it can be seen that a further cluster boundary Cdv2 coincides with a boundary of a GOP, also a still further cluster boundary Cdv3 to which the last end of the cluster M corresponds is positioned intermediately of a GOP. Then, the request response write data in this instance is written such that the last end thereof is positioned at an intermediate position of the cluster M+1 whose start position is the cluster boundary Cdv3.

In other words, in the example of FIG. 7, while the request response write data has a relationship to the clusters of the pattern 1, a GOP is divided at a cluster boundary (Cdv3) corresponding to the boundary between the file body (1) and the file body (2).

Here, it is assumed that the request response write data of the pattern 1 illustrated in FIG. 9 is successively recorded on the storage medium in accordance with the procedure described hereinabove with reference to FIG. 11. It is to be noted that, while it is described hereinabove that FIG. 11 illustrates the procedure where the request response write data having the pattern 3 and divided into three file bodies is recorded, since the request response write data in the present case has the pattern 1 and is divided into two file bodies, recording of the request response write data is performed actually in accordance with the procedure of FIG. 11 from which the steps S105 and S106 are omitted.

Then, it is assumed that, when the request response write data of FIG. 9 is successively recorded in accordance with the procedure according to FIG. 11, for example, writing of the file body (1) results in success but writing of the succeeding file body (2) results in failure. In this instance, according to the procedure of FIG. 11, updating of the file management information (FAT1, FAT2 and directory entry) is performed so that a result of the writing of the file body (1) is reflected normally by the processes at step S107 et seq. Thereafter, for example, a notification of failure in writing is issued, and for example, resetting of the digital video camera 1 is performed.

Then, for example, it is assumed that, after the resetting of the digital video camera 1 is performed in such a manner as described above, it is tried to reproduce a moving picture file recorded last. At this time, the moving picture file recorded last is managed by the FAT file system such that it is recorded up to the cluster boundary Cdv3 of FIG. 9 thereof. In other words, the last end cluster of the file is managed by the FAT file system such that it is the cluster M+1.

Upon reproduction of the last moving picture file, the file system executes reading out on the cluster level in accordance with a reproduction request for the moving picture file and passes the read out data to the application. The application processes the received data on the file level to reproduce and output the data. At this time, for example, the application treats the data of the cluster level passed thereto from the file system as a sequence of data of GOP units and causes the video signal processing section 4 to execute a decoding process in accordance with the MPEG format.

However, since the data of the moving picture file in this instance is managed such that it is embedded and recorded up to the cluster boundary Cdv3 of FIG. 9 as described hereinabove, actually the last end position of the moving picture file is an intermediate position of a certain GOP.

Where it is tried to execute a decoding process for compression coded data of the MPEG format, in which a GOP is not normally complete in this manner, and reproduce and output resulting data, the possibility that a reproduction error may occur is high. As described hereinabove, since a GOP is a minimum unit for a decoding process by bidirectional prediction, for example, even if only data of the front half of a GOP exists, if data of the latter half of the GOP is lost, then also data used for demodulation with the data of the front half may be lost occasionally. In this instance, a normal demodulation process cannot be performed. In other words, if a data unit as a GOP is separated at an intermediate position thereof, then only one of the separated data portions does not make sense. Thus, it is considered that only one of the data portions separated in this manner should not originally exist independently.

Then, if a normal decoding process cannot be executed, then a reproduction error may occur, and consequently, such a trouble that the system is placed into an abnormal condition or the operation is stopped abnormally (freezes) may occur. Thus, there is the possibility that the reliability of the apparatus may be deteriorated.

Incidentally, such a trouble as described above may possibly occur not only with a moving picture file but also with such a still picture file as described hereinabove with reference to FIG. 10. While the still picture file illustrated in FIG. 10 is of the JPEG format, it can be considered here that data units which form one file of the JPEG format correspond to GOPs of a moving picture file. This signifies that, in the example of FIG. 10, data of one still picture file compression coded in the JPEG format indicates a result recorded as that of the pattern 1 on the storage medium. In this instance, for example, if writing only of the file body (1) results in success but writing of the file body (2) results in failure, then when it is tried to reproduce the data later, there is the possibility that a reproduction error may occur because the data of the file body (2) cannot be utilized for the decoding process.

Therefore, in the present embodiment, the following procedure is proposed in order to record request response write data in such a manner that such a reproduction error as described above may be prevented.

Figure 12:
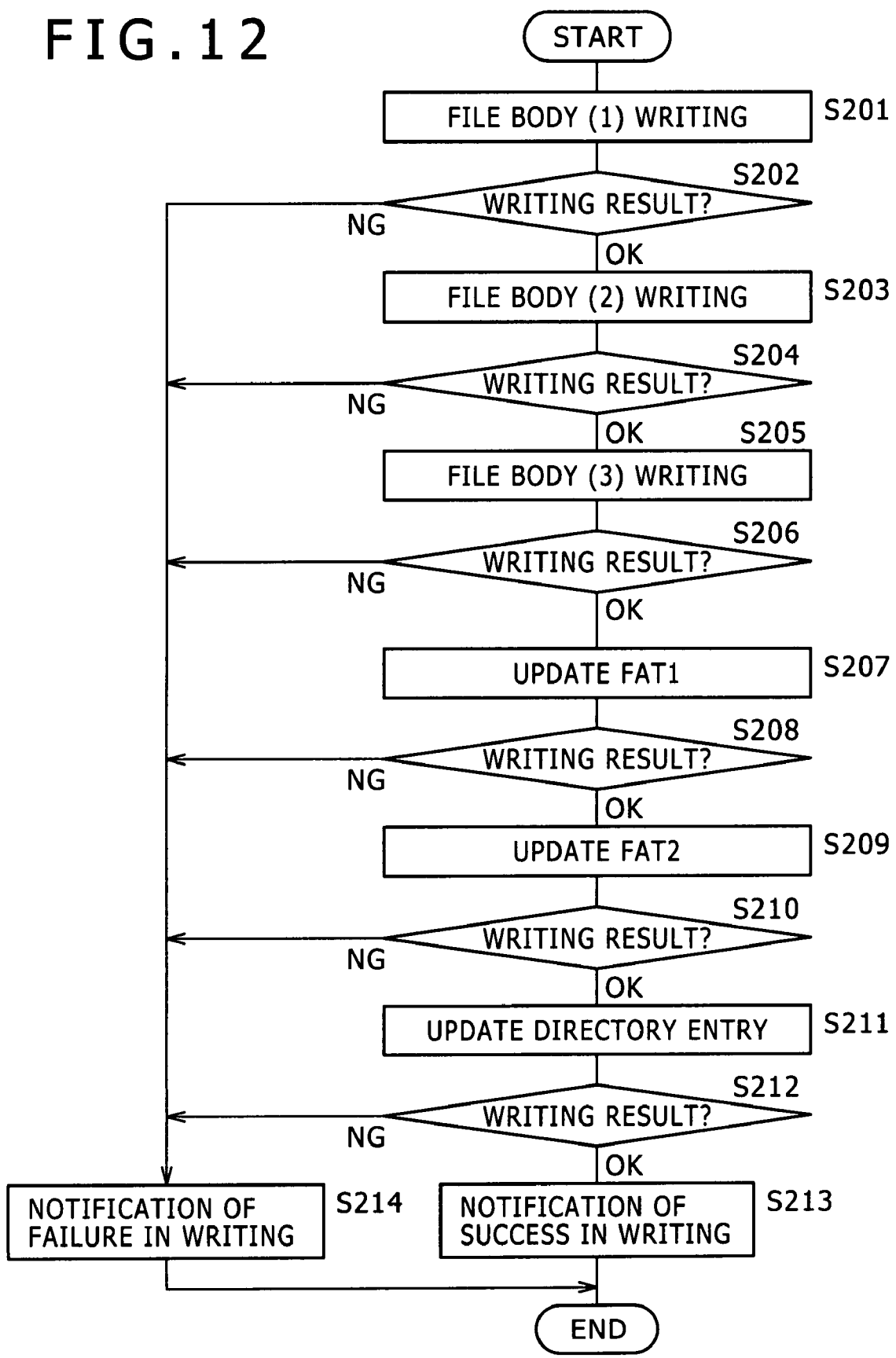
FIG. 12 is a flow chart illustrating an example of a procedure for writing request response write data on a storage medium in the digital video camera.

A flow chart of FIG. 12 illustrates an example of a procedure for recording request response write data according to the present embodiment. It is to be noted that also FIG. 12 illustrates an example of a control procedure when request response write data (request response write data N illustrated in FIG. 7) of the pattern 3 is written on the storage medium similarly as in the case of FIG. 11.

Referring to FIG. 12, control for writing the file body (1) on the storage medium is executed at step S201 similarly as at step S101 of FIG. 11. Then at next step S202, it is decided whether a result of the writing of the file body (1) at step S201 is success (OK) or failure (NG). If a result of NG is obtained, then the processing advances to step S214, at which a notification that the current writing of the request response write data results in failure is issued to the application similarly as at step S115 of FIG. 11.

On the other hand, if a result of decision that the writing result of the file body (1) is OK is obtained at step S202, then the processing advances to step S203, at which writing control of the file body (2) is executed. Then at step S204, decision regarding a result of the writing of the file body (2) is performed. If a decision result that the writing result is NG is obtained at step S204, then the processing advances to step S214, but if a decision result of OK is obtained, then the processing advances to step S205. At step S205, writing control of the file body (3) is executed. Then, if a result of decision that a result of the writing of the file body (3) is NG is obtained at step S206, then the processing advances to step S214, but if a decision result of OK is obtained, then a procedure for updating the file management information (FAT1, FAT2 and directory entry) at steps S207 to S212 is executed. It is to be noted that the procedure at steps S207 to S212 is similar to that at steps S107 to S112 of FIG. 11. However, since that the processing advances to step S207 in the procedure of FIG. 12 signifies that the writing of all of the file bodies (1), (2) and (3) results in success, the process at step S113 of FIG. 11 is omitted.

According to the procedure illustrated in FIG. 12, for example, when request response write data of the pattern 3 is to be recorded on the storage medium, if a writing result of any one of the file bodies (1), (2) and (3) results in NG during writing of the file bodies (1), (2) and (3), then the processing advances immediately to the procedure of issuing a notification of failure in writing of request response write data at step S214. In particular, for example, if writing of the file body (1) results in success and then writing of the file body (2) results in failure, then the processing advances to the writing failure notification without executing the updating process of the file management information which reflects the new recording of the file body (1). In other words, in the recording procedure of request response write data in the present embodiment, only when writing of all of file bodies which form the request response write data results in success, updating of the file management information is performed. In short, only when writing of data which forms the request response write data results fully in success, updating of the file management information according to a result of the writing is executed. It is to be noted that, where the request response write data is formed from two file bodies, the processes at steps S205 and S206 in FIG. 12 may be omitted.

Where the procedure illustrated in FIG. 12 is adopted, upon recording of one request response write data in the present embodiment, if writing of all file bodies which form the request response write data results in success, the request response write data is managed such that it is stored in the storage medium. However, if writing of any one of the file bodies results in failure, then the request response write data is managed such that it is not recorded on the storage medium. This signifies that, in the present embodiment, data of a moving picture file recorded on the storage medium always have a structure wherein request response write data is used as a minimum unit and also the position of the last end of the file is kept coincident with the position of the last end of request response write data. Then, when compared with the case illustrated in FIG. 9, it is assured that a moving picture file is always formed from a concatenation of normal GOPs. On the other hand, if recording is performed in accordance with the procedure of FIG. 11, then when writing of all data of the file is completed, the data of the file has a structure wherein request response write data is used as a minimum unit and also the position of the last end of the file can be made coincide with the position of the last end of request response write data. However, if writing results in failure intermediately of request response write data (writing of a second or later file body results in failure), then the last data portion becomes smaller than request response write data. When this is compared with the case of FIG. 9, the last end of the file may be positioned intermediately of a GOP as described hereinabove.

In this manner, in the present embodiment, where a moving picture file is taken as an example, a file structure which is complete as a concatenation of GOP units is assured irrespective of whether writing of data of the file results in success to the last end or results in failure intermediately. Consequently, according to the present embodiment, a file which may possibly cause an error in reproduction is prevented from being recorded wastefully.

It is to be noted that, as regards, for example, such a still picture file as shown in FIG. 10, if writing of data results in failure intermediately, then the file is managed on the file system such that it is not recorded on the storage medium. In other words, in this instance, a reproduction error is prevented by treating a file whose writing results in failure as a non-existing file.

If it is assumed that recording of a file is managed by the file system in such a manner as described above, then it is proper to successively update a recording result, for example, for every cluster which is a management unit of the file (according to the procedure of FIG. 11). However, according to this procedure, in the case of a moving picture file or a still picture file (particularly of the compression coded form), the possibility is high that a data portion necessary for reproduction of the file may miss, resulting in a reproduction error.

Therefore, the present embodiment adopts a way of thinking that, even if it is not tried to leave effective data by subdividing the data into cluster units, for a moving picture file, a process may be adopted which can leave data of a minimum reproduction unit (GOP) recorded normally to the last end. Further, the present embodiment adopts a way of thinking that, even if it is not tried to leave effective data by subdividing the data into cluster units, for a still picture file, a result that the file exists or that the file does not exist is obtained finally. On the ground of such ways of thinking as just described, in the present embodiment, a procedure based on the concept that file management information is not updated unless writing of all file bodies which form request response write data results in success as illustrated in FIG. 12 is configured.

Further, that writing of data is performed in accordance with such a procedure as illustrated in FIG. 12 signifies that file bodies and file management information (FAT1, FAT2 and directory entry) are not written at the same time on the storage medium but are written sequentially as the processing time passes.

Where data and management information are written sequentially in accordance with a time series in this manner, if such a trouble that, for example, the power supply is interrupted during rewriting occurs and interrupts the processing, then there is the possibility that some mismatching may occur, for example, between the substance of the data actually recorded on the recording medium and the substance of management of the file management information. Such mismatching may give rise to such a disadvantage that, for example, the size of effective recording data recorded actually on the storage medium and the size of the recording data managed by the file system differ from each other or, as occasion demands, normal accessing to the file may be disabled. Therefore, it is preferable to restore the matching state even if, for example, such a disadvantage as described above occurs.

Therefore, a configuration for restoring the matching of recording data management in a case wherein recording of a file on the storage medium is executed through the writing procedure of request response write data according to the present embodiment described hereinabove with reference to FIG. 12 is described below.

First, a writing control procedure of request response write data (file bodies) and file management information (FAT1, FAT2 and directory entry) illustrated in FIG. 12 is described below with reference to FIG. 14 in which the writing control procedure is schematically illustrated on the time axis.

Figure 14:
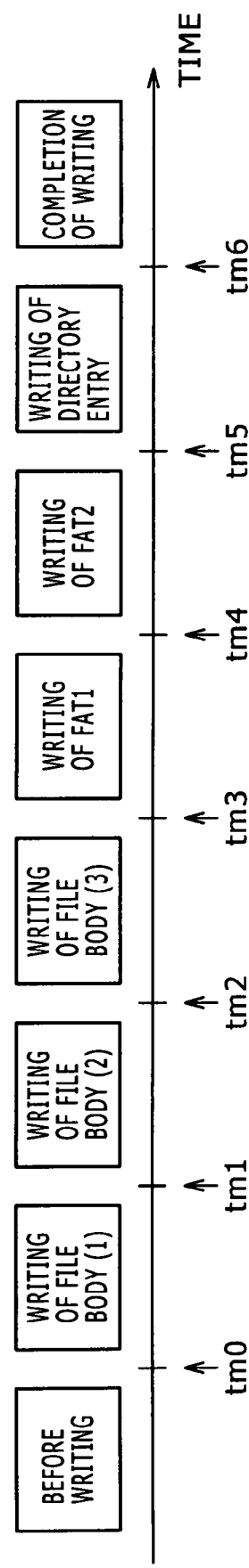
FIG. 14 is a diagrammatic view illustrating processing timings with respect to a writing sequence of request response write data.

As seen in FIG. 14, according to the writing control procedure illustrated in FIG. 12, writing of the file body (1), file body (2), file body (3), FAT1, FAT2 and directory entry on the storage medium is performed in this order as time passes. Thus, it is considered that the sequence of such a writing procedure as just described can be partitioned by seven processing timings of tm0 to tm7 as seen in FIG. 14.

The processing timing tm0 is a timing before writing of one request response write data is started, that is, a timing before writing of the file body (1) of the request response write data is started first.

The processing timing tm1 is a timing before writing of the file body (2) is started after the writing of the file body (1) ends.

The processing timing tm2 is a timing before writing of the file body (3) is started after the writing of the file body (2) ends.

The processing timing tm3 is a timing before writing of the FAT1 to be written first as file management information is started after the writing of the file body (3) ends.

The processing timing tm4 is a timing before writing of the FAT2 is started after the writing of the FAT1 ends.

The processing timing tm5 is a timing before writing of the directory entry is started after the writing of the FAT2 ends.

The processing timing tm6 is a timing at which the writing of the directory entry, that is, the writing of the one request response write data, ends.

After the processing timings for writing of one request response write data are set in such a manner as described above with reference to FIG. 14, in the present embodiment, backup information of the substance illustrated in FIGS. 15A and 15B is prepared. Then, the backup information is stored into a storage region (storage device) whose stored substance is not erased even if the power supply is interrupted such as, for example, the nonvolatile memory 12a.

FIG. 15A illustrates an example of a structure of the backup information.

Referring to FIG. 15A, the backup information includes a processing timing (progress information), a start cluster number, an end cluster number, a directory entry storage sector and a LBA on the storage medium into which the directory entry storage sectors are actually written. It is to be noted that, in the present embodiment, the directory entry storage sector and the corresponding information of the LBA in the backup information may be referred to collectively as "directory entry relating backup information (file management relating information)".

The processing timing region has a size of two bytes, and the value to be placed in the processing timing region is defined for each of the processing timings tm0 to tm6, for example, as illustrated in FIG. 15B. In this instance, the value is defined as:

tm0=0×11
tm1=0×21
tm2=0×22
tm3=0×23
tm4=0×30
tm5=0×40
tm6=0×00

The processing timing placed in the processing timing region is successively updated while the writing control sequence of request response write data is actually being executed. It is to be noted that the values corresponding to the processing timings specified as above are a mere example, and different values may be adopted alternatively.

In the region of the start cluster number, the number (address) of a cluster on the storage medium which includes a start position of request response write data to be written in the present cycle is placed. In the region of the end cluster number, the number of a cluster on the storage medium which includes an end position of request response write data to be written in the present cycle is placed. Here, if it is assumed that the request response write data is written into clusters of successive numbers, then those clusters which are to be used for writing of the request response write data to be written in the present writing cycle are represented by the start cluster number and the end cluster number (unit region use information).

In the directory entry storage sector, data of the directory entry having the updating substance for a case wherein the writing of request response write data in the current writing cycle is completed (results in success) is placed as effective data. Then, a sector in which the data of the directory entry placed in a size of one sector makes the directory entry storage sector here. It is to be noted that one sector has a size of 512 bytes, and corresponding to this, also the directory entry storage sector has a size of 512 bytes.

While the directory entry has a size of 32 bytes as described hereinabove with reference to FIG. 5, the minimum unit of data to be written into/read out from the storage medium is a sector unit to which the layer of the device driver corresponds. In this instance, if one sector has a size of 512 bytes, then the directory entry of 32 bytes is accommodated sufficiently in the sector size. Accordingly, upon recording of the directory entry, data of the directory entry is embedded in the size of one sector and the data of a sector unit is written on the storage medium. Then upon reading out, the sector in which the data of the directory entry is embedded is read out from the storage medium, and the data of the directory entry is extracted from the read out sector.

Corresponding to this, in the present embodiment, when data of the directory entry is to be placed into the backup information, data for one sector when the directory entry is recorded on the storage medium is placed. Consequently, where there is the necessity to write the directory entry of the backup information from the storage medium in order to restore the matching of file management as hereinafter described, when the directory entry is read out from the backup information, reading out is performed in a size of the one sector. Consequently, the read out data can be passed as it is, for example, to the device driver. In other words, for example, after the information of the directory entry of a size of 32 bytes is read out from the backup information, for example, the file system need not execute such a process as to embed the data of the directory entry into a sector. In this manner, according to the present embodiment, pass of data between the file system and the device driver upon writing of the directory entry of the backup information can be performed efficiently so that, for example, reduction of the processing burden may be achieved.

Further, the LBA placed in the same backup information indicates the position of the storage medium at which the directory entry storage sector is to be recorded actually.

Figure 16:
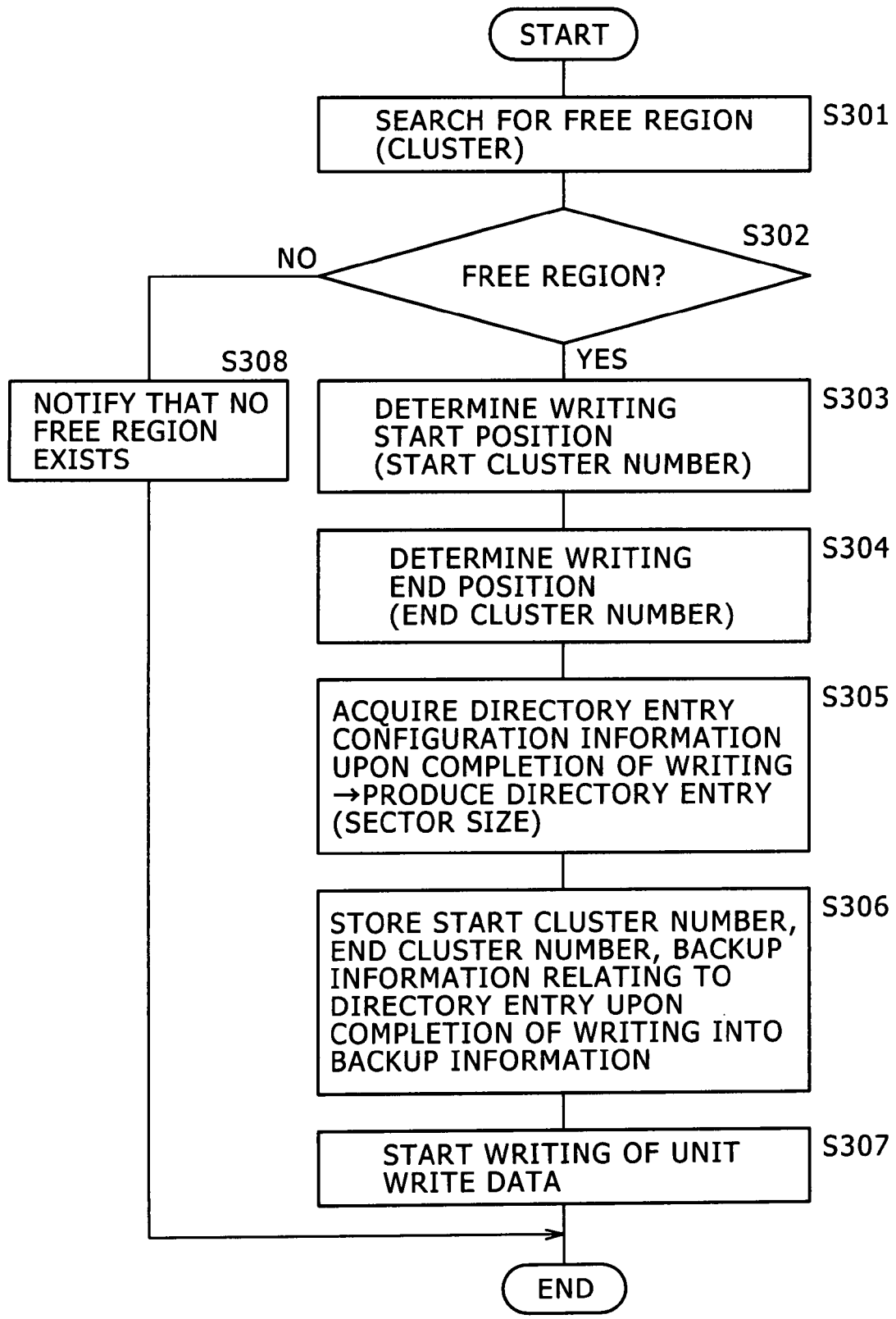
FIG. 16 is a flow chart illustrating an example of a procedure of a preparation process executed prior to writing of request response write data.

Now, a procedure for a preparation process when writing of one request response write data is started is described with reference to a flow chart of FIG. 16. In particular, when writing of one request response write data is to be actually executed in accordance with the procedure illustrated in FIG. 16 in response to a data writing request from the application, the procedure illustrated in FIG. 16 is executed by the file system before the writing is started.

For example, if the file system receives a data writing request, for example, from an application, then it searches for a free region (region in a cluster unit) sufficient to record the request response write data to be written in response to the data writing request at step S310. Then, the file system decides at step S302 whether or not a free region exists. For this process, the file system may refer to the substance of the latest file management information at the present stage. More particularly, the file system decides, by searching for a FAT entry which indicates an unused cluster registered in the FAT, whether or not there remains a number of unused clusters sufficient to accommodate the size of the request response write data to be written in the present writing cycle.

If it is decided at step S302 that a free region sufficient to write the request response write data in the present writing cycle does not exist, then the processing advances, for example, to step S308. At step S308, the file system issues a notification that there is no free region for the request response write data to be written in the present cycle to the application. The application receives the notification and stops, for example, if the moving picture file is being recorded, the recording operation till then. Further, the application outputs a message for notifying the user that the recording operation is stopped because of disappearance of a free region in a predetermined form. On the other hand, if recording of a still picture file is to be started, then the application gives up the recording of the still picture file and outputs a message for the notification that a sufficient storage capacity to record the file is not available.

On the other hand, if an affirmative result is obtained at step S302 because a free region exists, a preparation process for writing of the request response write data is executed at steps S303 to S307.

As the preparation process, first at step S303, a cluster including a writing start position when the request response write data in the present writing cycle is to be written on the storage medium is determined as the writing start position. This decision is made through a cluster number. In other words, the top cluster number on the storage medium into which the request response write data is to be written is determined here. Then at step S304, an end cluster number including a writing end position of the request response write data in the present writing cycle is determined. In this instance, if it is assumed that storage regions having successive cluster numbers are used for writing at least of the request response write data, then the end cluster number can be specified by successively incrementing the start cluster number by a required value based on the write start position of the request response write data in the present writing cycle in a cluster, the size of the request response write data and the cluster size.

Then at step S305, the application acquires the substance of information items which form the substance of the directory entry for a case wherein writing of the request response write data in the present writing cycle is completed (results in success).

The information which forms the directory entry is such as described hereinabove with reference to FIG. 5. Accordingly, at step S305, information of the name, extension, attribute, production time, production date, last access date, top cluster number, recording time, recording date and size which are information which forms the directory entry is produced. It is to be noted that, since, from among the information items mentioned, the name, extension, attribute, production time, production date and top cluster number are not information which particularly varies during recording of the data of the file, only if it is acquired and retained at step S305 when the first request response write data in the file of the recording object is recorded, there is no necessity to particularly re-acquire the information at step S305 in the later recording cycle. Also the information items such as the last access date, recording time and recording date may be same as the production time and production date when the file is recorded first, those acquired at step S305 in the first recording cycle may be utilized in the later writing cycles. In contrast, as regards the information item of the size, it is necessary to produce and acquire a value incremented in accordance with the size of request response write data every time request response write data is written on the storage medium. Then, the directory entry is produced making use of the information item produced in this manner. It is to be noted that the directory entry here is produced as data of a sector unit wherein, in a corresponding relationship to placement into the backup information, data of the entity of the directory entry of 32 bytes is embedded in the size of 512 bytes for one sector.

At next step S306, information of data of one sector including the start cluster number determined at step S303, the end cluster number determined at step S304 and the directory entry produced at step S305 and the LBA corresponding to the sector including the directory entry is placed into the backup information. It is to be noted, since the backup information is stored, in the present embodiment, in the nonvolatile memory 12a, a process of accessing to the nonvolatile memory 12a to write the information described above into an appropriate position of the backup information is executed.

Then, when the procedure for placement of the predetermined information items into the backup information at step S306 is completed, a writing procedure of the request response write data in response to the data writing request in the present writing cycle is started at step S307.

Figure 17:
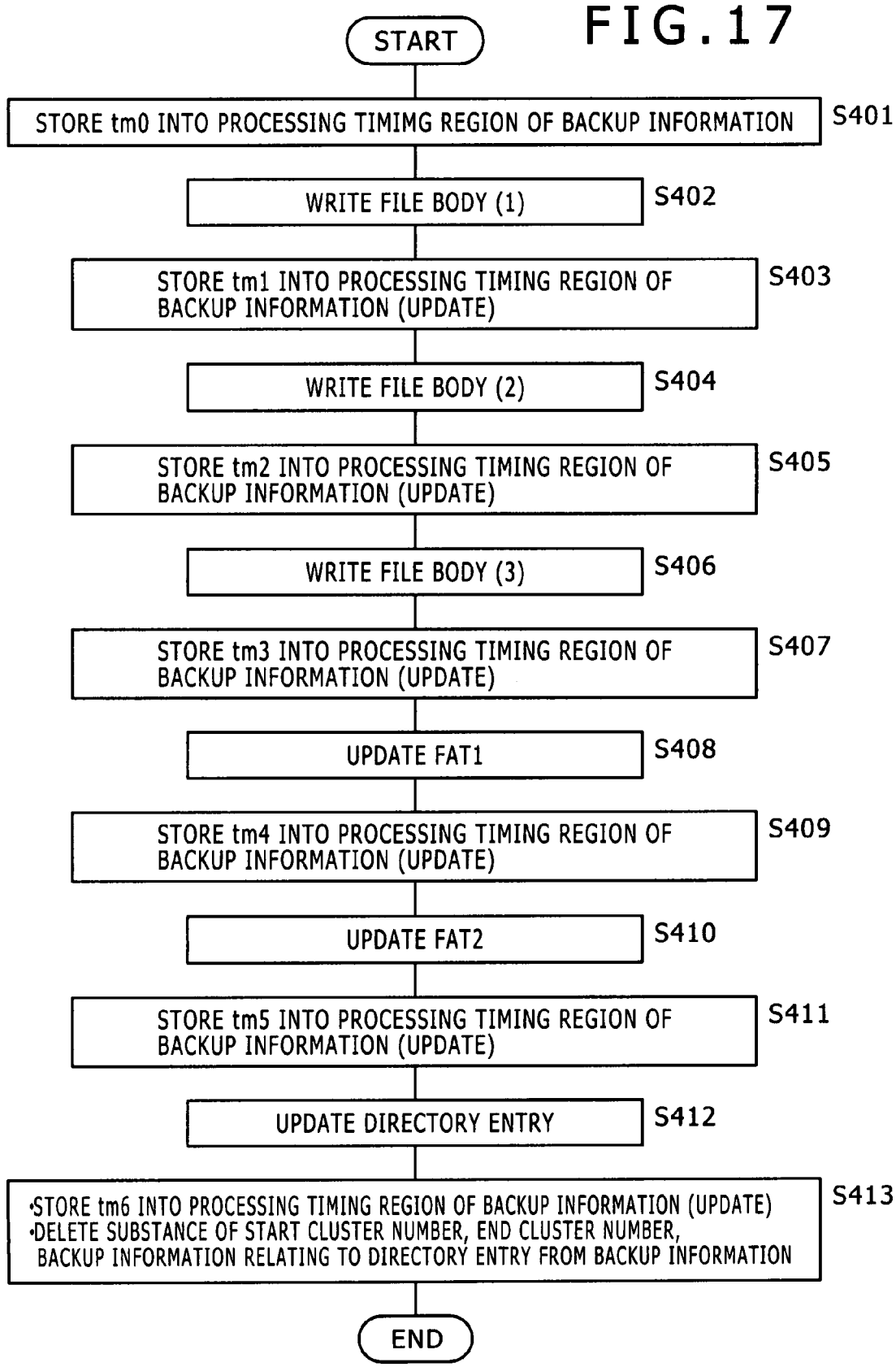
FIG. 17 is a flow chart illustrating an example of a writing procedure of request response write data including a process of backup information.

FIG. 17 illustrates the writing procedure of request response write data which is started at step S307 of FIG. 16. It is to be noted that it can be considered that also this procedure is executed, for example, by the file system. Further, FIG. 17 illustrates the writing procedure where request response write data of the structure of the pattern 3 is written similarly as in the procedure described hereinabove with reference to FIG. 12. Further, although, in the actual procedure, decision of whether a result of writing is OK or NG is performed every time writing of each of the file bodies (1), (2) and (3), FAT1, FAT2 and directory entry is executed, such writing result decision procedures as just mentioned are omitted in FIG. 17, but it is assumed that the file bodies (1), (2) and (3), FAT1, FAT2 and directory entry are written normally.

In the procedure illustrated in FIG. 17, as the request response write data are successively written, the processing timings tm0 to tm6 illustrated in FIG. 14 are reflected on the backup information in response to an actual progress of processing.

In particular, first at step S401, the value (0x10) indicative of the processing timing tm0 is placed into the processing timing region of the backup information of the nonvolatile memory 12a. Then at step S402, writing control of the file body (1) is executed. Then, when the process at step S402 is completed, the value to be placed into the processing timing region of the backup information is rewritten, at step ST403, from tm0 (0x10) placed at step S401 to tm1 (0x21) Then at step S404, writing control of the file body (2) is executed.

When the writing of the file body (2) is completed, the file system rewrites the processing timing region of the backup information from tm1 (0x21) to tm2 (0x22) at step S405. Then at step S406, the file system executes writing control of the file body (3).

When the writing of the file body (3) is completed, the file system rewrites the processing timing region of the backup information from tm2 (0x22) to tm3 (0x23) at step S407 and then executes writing control of the FAT1 at step S408.

When the writing of the FAT1 is completed, the file system rewrites the processing timing region of the backup information from tm3 (0x23) to tm4 (0x30) at step S409, and executes writing control of the FAT2 at step S410. When the writing of the FAT2 is completed, the file system rewrites the processing timing region of the backup information from tm4 (0x30) to tm5 (0x40) at step S411 and then executes writing control of the directory entry at step S412.

When the writing of the directory entry at step S412 is completed (results in success), the writing of the request response write data in the present writing cycle is completed normally. In response to the normal completion, the file system rewrites the processing timing region of the backup information from tm5 (0x40) to tm6 (0x00). Further, the file system deletes the start cluster number, end cluster number and substance of the directory entry relating backup information from the backup information of the nonvolatile memory 12a at step S413. The substance of the backup information obtained at step S413 is the initial values corresponding to those prior to the start of writing of the request response write data.

According to the writing procedure of request response write data described above with reference to FIG. 17, the substance stored in the processing timing region successively varies every time the writing of any of the file bodies (1), (2) and (3), FAT1, FAT2 and directory entry advances. From this, it is considered that the value placed in the processing timing region indicates a progress situation regarding the stage of the writing procedure of request response write data in the present embodiment illustrated, for example, in the flow chart of FIG. 12 or in FIG. 14. Then, if such a case that data recording ends intermediately from such a cause as, for example, unintended disconnection of the power supply is considered, then the substance of the processing timing region of the backup information in the nonvolatile memory 12a in this instance indicates to which stage the writing sequence of the last request response write data is completed normally. In other words, for example, if, when the power supply is made available, the processing timing region stored in the nonvolatile memory 12a is referred to, then it can be decided whether writing of the request response write data recorded last has been completed normally or has been ended abnormally during such writing. Further, if the writing has been ended abnormally, then it can be specified to which stage the writing sequence of request response write data has been ended normally.

Now, an example of a procedure executed by the file system in the present embodiment in order to restore the matching of file management is described with reference to a flow chart of FIG. 18.

Figure 18:
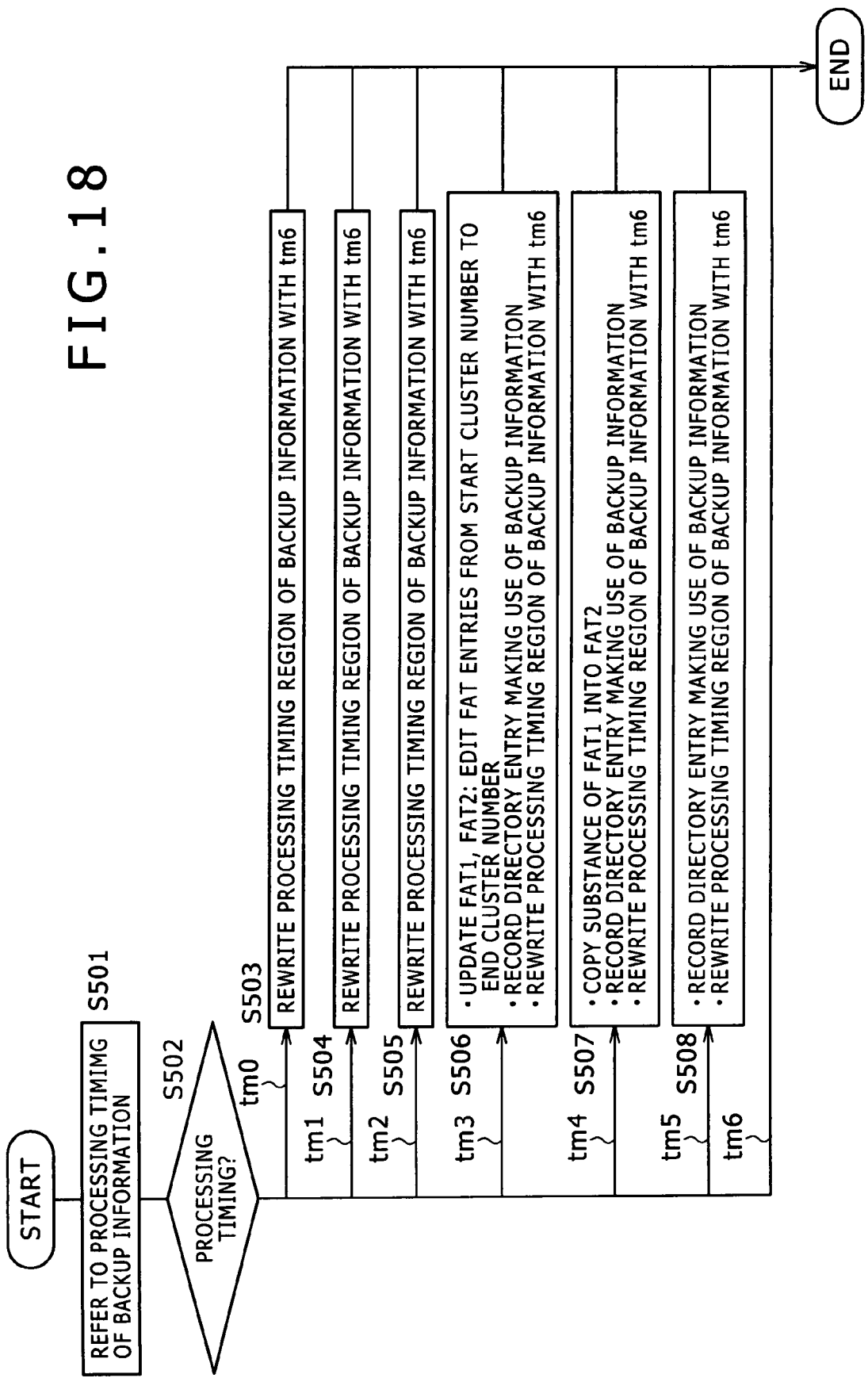
FIG. 18 is a flow chart illustrating an example of a procedure for matching restoration which makes use of backup information of the substance obtained by the procedure of FIG. 17.

The process illustrated in FIG. 18 is performed in prior, for example, when it becomes necessary to execute a mounting process of the storage medium (HDD) after the main power supply to the digital video camera 1 is switched on. Further, the process illustrated in FIG. 18 can be considered to be executed by the file system.

Referring to FIG. 18, first at step S501, the file system accesses the backup information of the nonvolatile memory 12*a* to read out the backup information to refer to the value (processing timing) placed in the processing timing region of the backup information. Then at step S502, the file system decides which one of the processing timings tm0 to tm6 the value referred to indicates.

Where the value decided at step S502 corresponds to the processing timing tm0, then the processing advances to step S503.

The processing timing tm0 indicates the stage before writing of request response write data is started as seen in FIG. 14. In particular, if the value decided at step S502 is the processing timing tm0, then this signifies that the writing sequence of request response write data in accordance with the last data writing request has resulted in failure, and as a result, the data writing process has ended intermediately at a timing before writing of the file body (1) at the first stage of the request response write data writing sequence is to be started.

In this instance, although the request response write data corresponding to the last data writing request is not recorded on the storage medium at all, the writing sequence of request response write data corresponding to the second last data writing request completed normally. In this instance, since the entity of the last request response write data is not written at all, it is impossible to obtain the file management substance in a state wherein the request response write data is recorded normally.

Therefore, the procedure illustrated in FIG. 17 is quitted while no process is executed at step S503 except to set the value of the processing timing region of the backup information retained in the nonvolatile memory 12*a* to the initial value of tm0. Consequently, the matching of file management is maintained in that request response write data up to the request response write data corresponding to the second last data writing request are managed normally.

If it is decided at step S502 that the value referred to indicates the processing timing tm1, then this represents that the writing sequence of the last request response write data has resulted in failure. As a result, only writing of the data up to the file body (1) ended normally, and the next file body (2) is not written at all or is written to only an intermediate portion thereof. Therefore, a normal recording result of data of the file body (2) and so forth is not assured. In this instance, the processing advances to step S504.

Where only the file body (1) is written normally as described above, the file bodies (2) and (3) which are the entity of the remaining writing unit data do not exist at this point of time. Therefore, it is impossible to obtain the file management substance in a state wherein the request response write data is recorded normally.

Therefore, at step S504, the file system executes a process of setting the value of the processing timing region of the backup information to the initial value of tm0 to initialize the substance of the processing timing region in a similar manner as at step S503 described hereinabove.

If it is decided at step S502 that the value referred to indicates the processing timing tm2, then this represents that the writing sequence of the last request response write data has resulted in failure. As a result, only writing of the data up to the file bodies (1) and (2) ended normally, and a normal recording result of data of the file body (3) and so forth is not assured. Also in this instance, the file body (3) which is the entity of the remaining writing unit data does not exist at this point of time. Therefore, at step S505, the file system executes a process of setting the value of the processing timing region of the backup information to the initial value of tm0 to initialize the substance of the processing timing region in a similar manner as at steps S503 and S504 described hereinabove.

If it is decided at step S502 that the value referred to indicates the processing timing tm3, then this represents that the writing sequence of the last request response write data has resulted in failure. As a result, writing of the data up to the file bodies (1), (2) and (3) ended normally, but a normal recording result of data of the FT1, FT2 and directory entry is not assured.

This result corresponds to a state wherein, although the entity (file bodies (1), (2) and (3)) of the last request response write data is written on the storage medium, the writing result is not reflected on the file management information, that is, the file management substance is in a mismatching state. However, where the entity of the last request response write data is recorded on the storage medium in this manner, it is possible to manage the last request response write data on the file system such that the data is recorded normally making use of the backup information. In other words, the matching can be restored. To this end, a process at step S506 is executed.

At step S506, the file system refers to the start cluster number and the end cluster number of the backup information read in at step S501 to edit the FAT entry such that a cluster chain of clusters of the numbers from the start cluster number to the end cluster number is formed with regard to the FAT1. Since the start cluster number and the end cluster number of the backup information represent the cluster numbers of the first cluster and the last cluster, respectively, of the cluster group in which the last request response write data is written, by editing the FAT entry in such a manner as described above, in the FAT1, the last request response write data is managed such that it is recorded on the storage medium. Further since the FAT region includes also the FAT2 together with the FAT1, the file system performs editing also regarding the FAT2 similarly to that regarding the FAT1.

It is to be noted that the editing of the FAT entry in this instance is performed based only on the start cluster number and the end cluster number in which the last request response write data is written, and information of the cluster numbers between the start cluster number and the end cluster number does not exist. Therefore, it is assumed that the clusters used for writing of the last request response write data have successive or consecutive cluster numbers. However, actually data of such a size as that of unit writing request data is recorded in almost all cases in regions having successive cluster numbers (regions which are physically contiguous to each other). Accordingly, such editing of the FAT entry does not give rise to a problem in practical use. If it is tried to cope with an alternative case wherein unit writing request data is recorded discretely without being recorded in regions having successive cluster numbers, then also information representative of concatenations of used clusters should be placed in the backup information in addition to the start cluster number and the end cluster number.

As a next process at step S506, the file system makes use of the directory entry relating backup information (directory entry storage sector and LBA) of the backup information to execute a control process for writing and recording a directory entry of the substance corresponding to a result of completion of writing of the last request response write data on the storage medium.

To this end, the file system refers to the LBA of the backup information. The LBA indicates the position (sector) on the storage medium at which the directory entry of the file formed including the last request response write data as data is recorded. Then, the file system performs control for the device driver to perform control for writing the data of the directory entry storage sector placed in the backup information, for example, into a sector indicated by the LBA. The directory entry placed in the directory entry storage sector has the substance corresponding to that where writing of the last request response write data is completed in success.

Since the process described above is executed at step S506, the file management information is updated so as to have the substance on which a result of writing of the last request response write data is reflected. In particular, from a mismatching state wherein, although, before the process at step S506 is executed, real data of the last request response write data is written on the storage medium, a result of the writing of the last request response write data is not reflected on the file management information, restoration of the matching is achieved so as to establish a state wherein the result of the writing of the last request response write data is reflected on the file management information.

After restoration of the matching of file management is achieved in such a manner as described above, at step S506, the file system writes the value representing tm0 into the processing timing region of the backup information to initialize the substance of the processing timing region in a similar manner as at steps S503, S504 and S505 described hereinabove.

If it is decided at step S502 that the value referred to indicates the processing timing tm4, then this represents that the writing sequence of the last request response write data has resulted in failure. This signifies that, although writing of the file bodies (1), (2) and (3) ended normally and only the FAT1 from within the file management information was completed, normal recording of data of the remaining FT2 and directory entry is not assured.

In this instance, similarly as in the case wherein the decision result at step S502 is the processing timing tm2, writing of the real data of the last request response write data is completed, and therefore, restoration of the matching can be achieved such that the result of the writing is reflected on the file management information. Then, as a process for the restoration of matching, a process at step S507 is executed.

In this instance, not only the real data of the last request response write data but also the FAT1 of the file management information are recorded normally on the storage medium such that they have the substance on which the result of writing of the last request response write data is reflected. Accordingly, in this instance, there is no necessity to particularly edit the FAT1. Also as regards editing of the FAT2, if it is prescribed that the FAT2 has the copy substance of the FAT1, then the editing of the FAT2 may be performed by a process of copying the substance of the FAT1 on the FAT2. In particular, there is no necessity to particularly refer to the start cluster number and the end cluster number of the backup information to edit the FAT entry as at step S506. Thus, the editing process can be achieved by a process lighter and more efficient as much.

Further, at step S507, also a process of recording the directory entry of the substance on which the writing result of the last request response write data is reflected on the storage medium is executed as a process for restoring the matching. This process is executed making use of the directory entry relating backup information (data of the directory entry storage sector and LBA) of the backup information in a similar manner as at step S506. Also in this instance, the value representing tm0 is placed in order to initialize the processing timing region of the backup information.

If it is decided at step S502 that the value referred to indicates the processing timing tm5, then this represents that the writing sequence of the last request response write data has resulted in failure. This signifies that, although writing of the file bodies (1), (2) and (3) ended normally and writing of the FAT1 and the FAT2 from within the file management information was completed, normal recording of data of the remaining directory entry is not assured.

In this instance, as a process for the restoration of matching, a process at step S508 is executed. In this instance, since recording of the FAT1 and the FAT2 of the file management information is completed already, as a necessary process for restoration of the matching at step S508, a directory entry on which a result of the writing of the last request response write data is reflected may be recorded on the storage medium while omitting editing of the FAT region. Then, the value representing tm0 is placed into the processing timing region of the backup information to initialize the processing timing region.

If it is decided at step S502 that the value referred to indicates the processing timing tm6, then this represents that the first writing of the file body (1) of the last request response write data to the last writing of the directory entry ended normally. In other words, the writing sequence of the last request response write data has resulted in success, and file management is performed in a state wherein the writing result of the last request response write data is reflected already. Therefore, in this instance, the procedure of FIG. 18 is quitted immediately without particularly executing a process for restriction of the matching.

It is to be noted that, after the procedure for restoration of matching illustrated in FIG. 18 comes to an end, for example, a process of mounting a storage medium is executed to allow a file operation and a data process by such an architecture as, for example, shown in FIG. 2.

In the following, modifications to the processing procedure for restoration of matching of file management are described.

The procedure for matching restoration illustrated in FIG. 18 is intended to restore the matching so that the last request response write data can be managed effectively as far as possible. However, also it is effective to otherwise adopt such a simple idea that, if a writing sequence of the last request response write data results in failure, then operation for restoration relating to the last request response write data is not performed at all but the last request response write data is treated such that it does not exist from the beginning. Also where the idea just described is adopted, the file recorded last is managed appropriately such that it is composed of a request response write data group recorded prior to the last request response write data. Further, where an algorithm based on the idea described above is adopted, there is the possibility that it may be simpler, for example, than that in the case of FIG. 18 and such an advantage that the processing burden is reduced may be achieved.

Thus, an example of a procedure for matching restoration for managing the last request response write data such that the last request response write data does not exist from the beginning if a writing sequence of the last request response write data results in failure is described with reference to FIG. 19.

First at steps S601 and 602, the value placed in the processing timing region of the backup information is referred to decide which one of the processing times tm0 to tm6 the place value indicates in a similar manner as at steps S501 and S502 of FIG. 18.

Then, if a result of the decision at step S602 indicates that the placed value is one of the processing timings tm0, tm1, tm2, tm3 and tm4, then only a process of placing the processing timing tm0 into the processing timing region of the backup information to initialize the processing timing region is executed at steps S603, S604, S605 S606 and S607 for the matching restoration, respectively. Where FIG. 19 is compared with FIG. 18, it can be recognized that, when it is decided that the value is the processing timing tm3, such an operation of the file management information as in FIG. 18 is not performed. In other words, in the procedure of FIG. 19, even if real data of the last request response write data is not written fully on the storage medium, no particular operation is performed for the management information but the last request response write data is managed such that it is not recorded on the storage medium.

On the other hand, if the decision result at step S602 indicates that the placed value is the processing timing tm4, then as a process for matching restoration at step S607, the substance of the FAT2 is copied into the FAT1 and then the processing timing region of the backup information is initialized.

Where the placed value is the processing timing tm4, this signifies that writing of real data of the last request response write data and writing of the FAT1 are completed normally. Accordingly, the FAT1 has the substance on which a writing result of the last request response write data is reflected. In the meantime, the FAT2 has the substance same as that before the writing result of the last request response write data is reflected, that is, the substance on which a writing result of data up to the second last request response write data is reflected. Therefore, if the substance of the FAT2 is copied into the FAT1 similarly as at step S697, then the writing result of data up to the second last request response write data is reflected on both of the FAT1 and the FAT2. This state coincides with the substance of the management that the last request response write data is not recorded.

Further, in this instance, since the directory entry of the file recorded last on the storage medium remains having the substance on which the writing result of data up to the second last request response write data is reflected, there is no necessity to particularly perform an operation for the directory entry at step S607.

On the other hand, if the decision result at step S602 indicates that the placed value is the processing timing tm5, then a process for matching restoration at step S608 is performed.

Where the processing timing is tm5, although recording of the real data of the request response write data in the writing sequence of the last request response write data is completed and the data up to the FAT1 and the FAT2 of the file management information is updated, the directory entry is not updated.

In order to manage the last request response write data in such a state of the recording result as just described such that the last request response write data is not recorded, then it is necessary to restore the FAT1 and the FAT2 to those in the state before updated. To this end, at step S608, the FAT1 and the FAT2 are rewritten so that a value representing an unused state is placed into those FAT entries which correspond to cluster numbers from the start cluster number to the end cluster number obtained by referring to the backup information. As a result, the substances of the FAT1 and the FAT2 indicate that the last request response write data does not exist.

Figure 19:
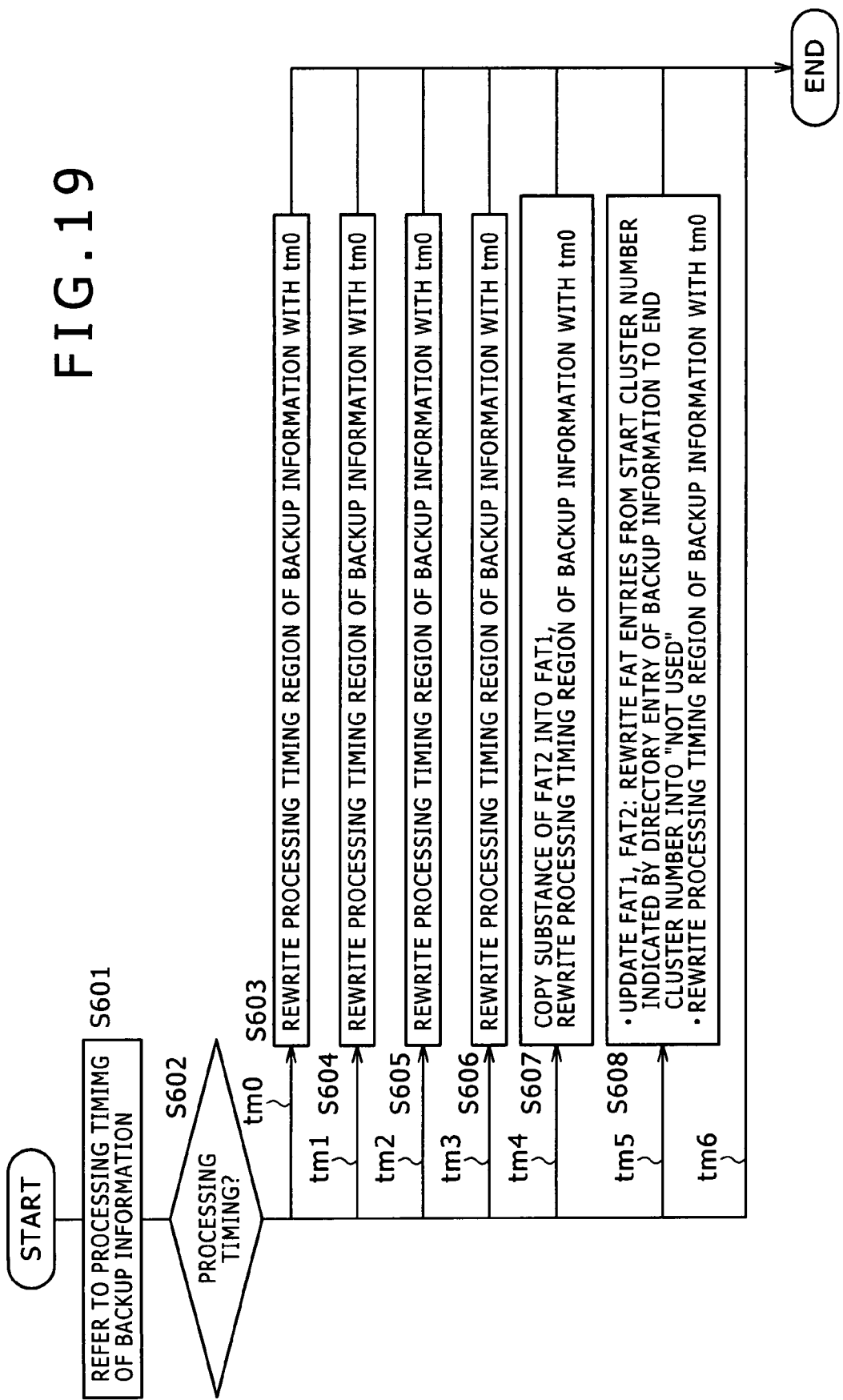
FIG. 19 is a flow chart illustrating a modification to the procedure for matching restoration and illustrating another example wherein backup information of the substance obtained by the procedure of FIG. 17 is utilized.

Further, also in this instance, since the directory entry of the file recorded on the storage medium last remains having the substance on which the writing result of data up to the second last request response write data is reflected, the process of FIG. 19 is quitted immediately without particularly executing a process for matching restoration.

On the other hand, if it is decided at step S602 that the placed value indicates the processing timing tm6, then this signifies that the writing sequence of the last request response write data is completed normally (results in success) and the last request response write data is managed normally. Therefore, the processing of FIG. 19 is quitted immediately without particularly executing a process for matching restoration.

It is to be noted that, when the procedure described above with reference to FIG. 19 is utilized to restore the matching, the directory entry relating backup information of the backup information is not utilized. Accordingly, where the procedure of FIG. 19 is adopted, the directory entry relating backup information can be omitted from the backup information.

Now, another modification to the processing procedure for matching restoration of file management is described.

For the present modification, backup information having such a structure as illustrated in FIG. 20 is adopted.

Referring to FIG. 20, the backup information illustrated includes regions for a processing timing, a start cluster number, an end cluster number, a directory entry storage sector and a LBA similarly as in the backup information illustrated in FIG. 15A. However, the backup information of FIG. 20 additionally includes regions for storing a start LBA of the file body (3), a size of the file body (3) and real data (write data) of the file body (3).

The start LBA (data part write position information) of the file body (3) has, for example, a size of approximately four bytes. Where it is assumed that the last request response write data has a structure of the pattern 3, the start LBA indicates a LBA on the storage medium into which the start position of the last file body (3) from among the file bodies which form the last request response write data is to be written.

Also the region for the size of the file body (3) has a size of approximately four bytes allocated thereto, and indicates an actual data size of the file body (3).

In the region for the write data of the file body (3), data (complementation real data) of the substance same as that of the actual data of the file body (3) of the last request response write data is placed. The size of the request response write data is variable, and also the size of the file bodies which form the request response write data is variable. Accordingly, also the region of the write data of the file body (3) placed in the backup information has a variable size. The size of the region is indicated by the size of the file body (3). For example, when the file system or the like tries to read out write data of the file body (3) from the backup information, it executes the reading out appropriately making use of the information of the size of the file body (3) described above.

It is to be noted that, in the description hereinafter given, the start LBA of the file body (3), the size of the file body (3) and write data of the file body (3) are collectively referred to as file body relating backup information.

Figure 21:
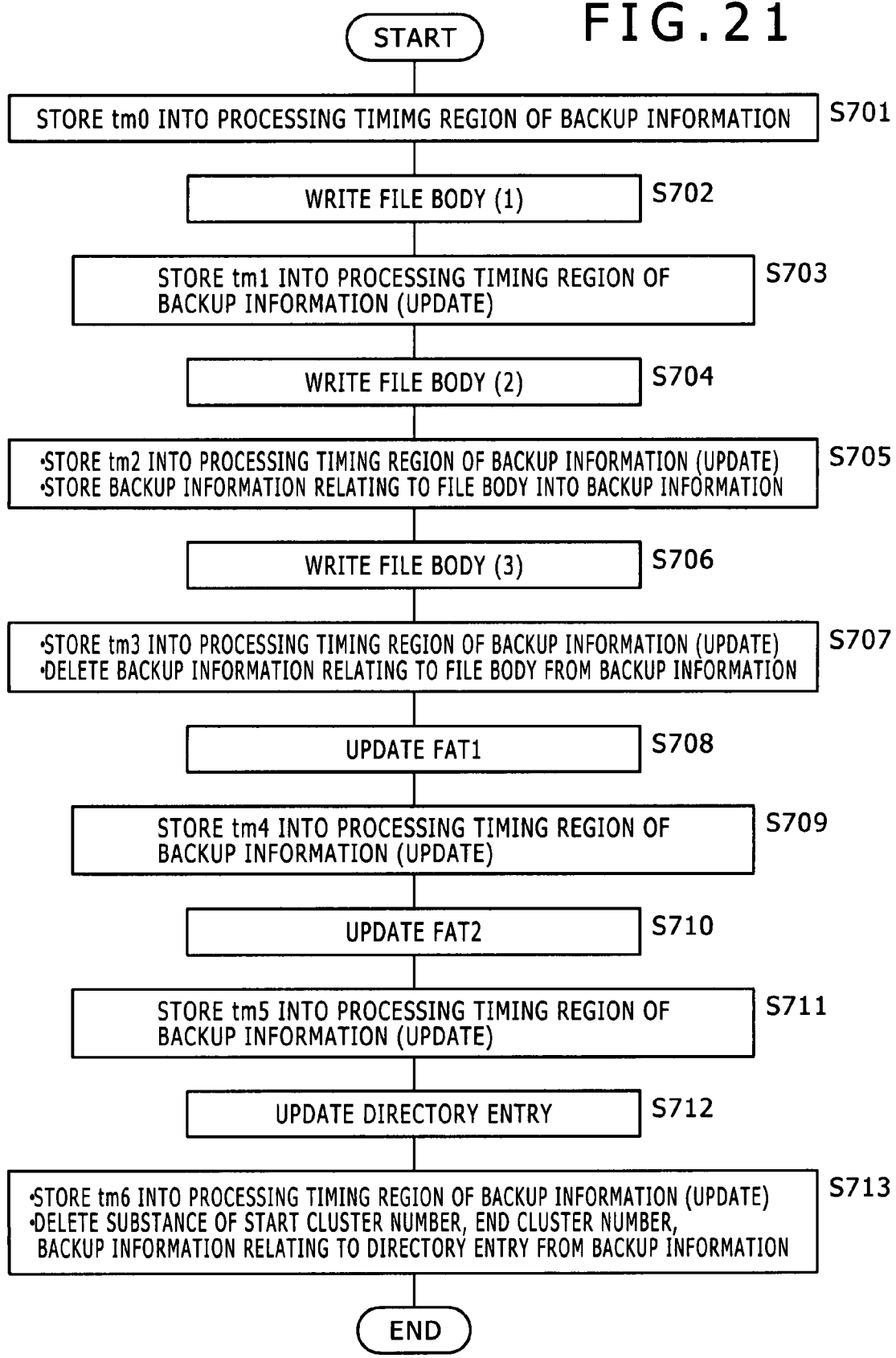
FIG. 21 is a flow chart illustrating an example of a writing procedure of request response write data including a process of backup information, which corresponds to the modification to that of FIG. 19.

FIG. 21 illustrates an example of a writing procedure of request response write data (having the structure of the pattern 3) corresponding to the structure of the backup information described above with reference to FIG. 20.

The procedure illustrated in FIG. 21 is basically same as the procedure illustrated in FIG. 17. Therefore, description of like matters to those of FIG. 17 is omitted herein while description principally of differences is given below.

A process at step S705 in FIG. 21 is performed at a timing next to a timing at which writing of the file body (2) is completed similarly to the process at step S405 of FIG. 17. However, at step S705, in addition to placement of a value representative of tm2 into the processing timing region of the backup information, a process of placing the file body relating backup information (start LBA of the file body (3), size of the file body (3) and write data of the file body (3)) into the same backup information is executed.

The stage at step S705 corresponds, for example, to a period of time within which the processing advances to writing of the file body (3) after writing of the file body (2) on the storage medium is completed at step S704. However, at this timing, usually the sector address (that is, the LBA) as the writing start position of the file body (3) and information of the size of real data of the file body (3) to be written are already grasped by the file system.

Therefore, at step S705, the file system uses the information grasped thereby to produce information of the LBA of the file body (3) of four bytes and the size of the file body (3) and places the information into corresponding regions of the backup information. Further, as regards the write data of the file body (3), the data of the file body (3) prepared so as to be actually written may be written into and retained by the corresponding region of the backup information by copying.

Further, at step S707 after the writing of the file body (3) at step S706 is completed, a process of placing tm3 into the processing timing region of the backup information is executed similarly, for example, as at step S407 of FIG. 17. Further, a process of deleting the file body relating backup information (start LBA of the file body (3), size of the file body (3) and write data of the file body (3)) placed in the backup information at step S705 from the backup information is executed.

Then, although it can be recognized from a process hereinafter described with reference to FIG. 22, the file body relating backup information is required, in the process for matching restoration of file management in this instance, only when the value placed in the processing timing information of the backup information indicates tm3 as a case wherein the writing sequence of the last request response write data results in failure. Therefore, at step S706, in response to completion of the writing of the file body (3), the relating information is deleted from the backup information. This is intended to minimize, for example, the size of the backup information, and such an effect that the capacity of the nonvolatile memory 12a to be used can be saved is achieved.

Figure 22:
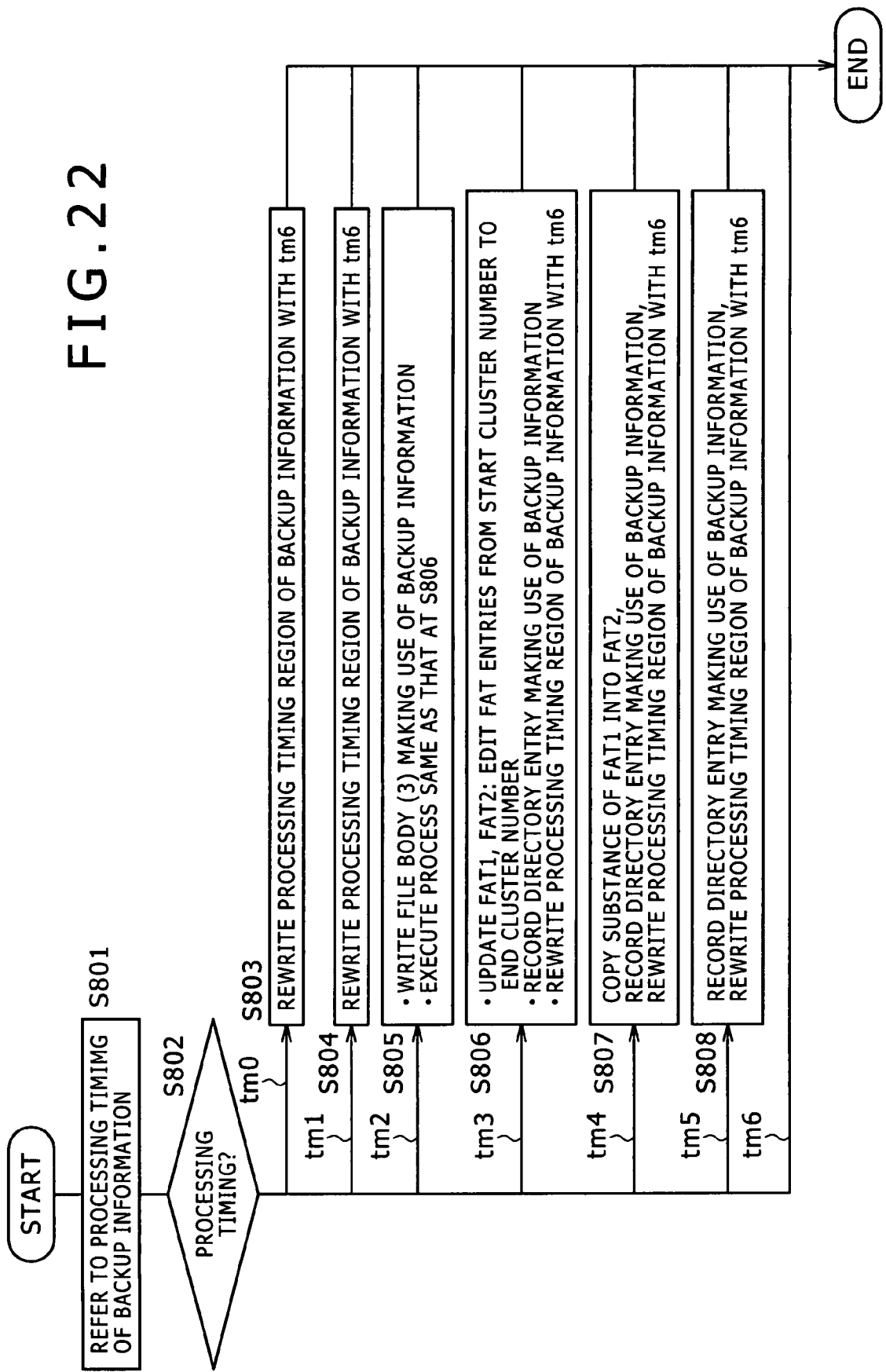
FIG. 22 is a flow chart illustrating an example of a procedure for matching restoration corresponding to the medication to that of FIG. 19.

FIG. 22 illustrates an example of a procedure for matching restoration to be executed in response to a writing process of the backup information structure illustrated in FIG. 20 and the request response write data of FIG. 21.

Also in the process of FIG. 22, first at steps S801 and 802, the value placed in the processing timing region of the backup information is referred to decide which one of the processing times tm0 to tm6 the placed value indicates in a similar manner as at steps S501 and S502 of FIG. 18. Then, a process corresponding to the decision result is executed.

Then, if the decision result at step S802 indicates that the placed value is one of the processing timings tm0, tm1, tm3, tm4 and tm5, then a process of the substance similar to that at step S503, S504, S506, S507 or S508 is executed at step S803, S804, S806, S807 or S808. Also where it is decided that the placed value is the processing timing tm6, no particular restoration process is executed similarly as in the process of FIG. 18.

However, if it is decided at step S802 that the placed value is the processing timing tm2, then the following procedure different from that at step S505 of FIG. 18 is executed as a restoration process at step S805.

First, the case wherein it is decided at step S803 that the placed value is the timing tm2 is a case wherein writing of data up to the file bodies (1) and (2) is completed in the writing sequence of the last request response write data but writing of the file body (3) and the file management information is not performed as yet. In the process of FIG. 18, since the data of the file body (3) is not recorded on the storage medium, it is impossible to establish a state wherein the entity of the last request response write data is recorded fully on the storage medium.

In contrast, in the present modification, the relating backup information regarding the file body (3) is available as seen in FIG. 20. Since the file bodies are recorded already on the storage medium, if the data of the file body (3) placed in the backup information is written into a pertaining position, then a state wherein the request response write data composed of the file bodies (1), (2) and (3) is fully written on the storage medium is established. From this, it can be considered that write data of the file body (3) in the backup information is data used for complementation for writing the request response write data on the storage medium. Therefore, at step S805, control for making use of the file body relating backup information to actually write the file body (3) on the storage medium is executed.

In particular, the file system designates the start LBA of the file body relating backup information as the writing start position of the file body (3) and controls the device driver so that the write data of the file body (3) placed as the same file body relating backup information in the backup information is read out and written on the storage medium. By the process till then, a state wherein all of the file bodies (1), (2) and (3) which form the last request response write data are written at pertaining positions of the storage medium can be established on the storage medium. Further, at step S805, a procedure same as that at step S806 is executed. Consequently, the file management information comes to have the substance on which the writing result of the last request response write data is reflected.

For example, the procedure described hereinabove with reference to FIG. 18 is provided in order to restore, also when a writing sequence of the last request response write data results in failure, the matching so that file management on which a writing result of the last request response write data is reflected may be performed as far as possible. However, according to the procedure of FIG. 18, if writing of all real data (file bodies (1), (2) and (3)) is not completed in the sequence of the last request response write data, then the matching cannot be restored to the file management state on which the last request response write data is reflected.

In contrast, according to the modifications described above with reference to FIGS. 20 to 22, when a writing sequence of the last request response write data results in failure, if a processing result is such that writing of data up to the file bodies (1) and (2) (up to the second last file body) is completed, then restoration of matching in a file management state on which the last request response write data is reflected can be achieved by writing the file body (3) and then updating the file management information. In other words, the modifications are more advantageous in that the matching is restored such that a writing result of the last request response write data is reflected as far as possible.

However, also the procedure of FIG. 18 is actually effective. For example, according to the procedure of FIG. 18, since a process for placing data of a comparatively large size such as a file body into backup information is not performed, the processing is simple and light and enhancement of the speed of processing can be anticipated as much. Further, also the allowable storage capacity of the nonvolatile memory 12a can be suppressed. Under present conditions, a semiconductor memory element such as a flash memory adopted as the nonvolatile memory 12a still remains high in bit unit price when compared with a HDD and so forth, and it is difficult to incorporate a semiconductor memory of a large capacity from a problem of the cost and so forth. Accordingly, for example, which one of the procedure of FIG. 18 and the modified procedures should be adopted should be determined taking various conditions demanded for an apparatus into which the function is to be incorporated into consideration.

It is to be noted that, in the modifications described hereinabove with reference to FIGS. 20 to 22, when a failure occurs at a stage at which the file body (1) or (2) is being written, then such a remedial process as to restore the last request response write data is not performed, but the last request response write data is treated such that it is not recorded. However, if the backup relating information regarding the file body (2) together with the file body (3) is placed into the backup information, then also when a failure occurs at a writing stage of the file body (2), the matching can be restored by restoring the last request response write data. Similarly, if the backup relating information regarding the file body (1) is placed together with the file bodies (3) and (2), then also when a failure occurs at a writing stage of the file body (1), the last request response write data can be restored. In this instance, however, it is necessary to place write data of the file body (2) and further of the file body (1) into the backup information together with write data of the file body (3), and also the size of the backup information increases considerably. Thus, it is considered that it may become necessary to take, for example, such a processing speed, an allowable storage capacity of the nonvolatile memory 12a and so forth as described above into consideration.

Further, in the foregoing description, request response write data of the pattern 3 wherein the request response write data is divided into three file bodies is a processing object. The pattern 3 is the most complicated pattern where request response write data is regarded as a structure composed of file bodies as can be recognized from FIG. 7. Accordingly, the writing procedures of request response write data and the procedures for matching restoration described hereinabove can be applied also to the other cases (patterns 1, 2 and 4) wherein request response write data is formed from two file bodies or less.

Further, while the FAT file system is adopted for file management in the embodiment described above, the present invention can be applied also to the other file systems beginning with, for example, a HFS (Hierarchical File System). Further, there is no restriction particularly with regard to the file system and the standards for the file management system. Further, for the storage medium used to store a file, any other storage medium than a HDD described in connection with the embodiment of the present invention may be used.

Further, the form of a file formed from request response write data (writing request data) in the embodiment is an image file of moving pictures, still pictures or the like. Particularly where a compression coded data file is involved, such a situation that an intermediate position of a minimum decoding unit such as a GOP of the MPEG format sometimes corresponds to a boundary of a cluster occurs, and the present invention is effective in that a disadvantage arising from the situation described above is prevented as described hereinabove. However, the present invention can be directed also to a different file format of such a structure that, for example, only sound data is included but no image data is included. Particularly where the file is composed of compression coded data, the present invention is effective similarly to moving picture files. Further, the present invention may be applied also to document files and so forth other than image and sound files and are considered sufficiently effective depending upon the file structure.

Furthermore, the data recording apparatus of the present invention is not limited to the digital still camera described in connection with the embodiment of the present invention. For example, the present invention can be applied to digital still cameras, reservation recording apparatus for television broadcasting programs, personal computers and various similar information processing apparatus only if they can perform data processing such as data writing/reading out on/from various storage media.

While a preferred embodiment of the present invention has been described using specific terms, such description is for illustrative purposes only, and it is to be understood that changes and variations may be made without departing from the spirit or scope of the following claims.

The invention claimed is:

1. A data recording apparatus, comprising:

a recording data acquisition section configured to acquire, as data to be recorded on a recording medium, request response write data which is a unit of data to be written on the recording medium in response to a data writing request;

a data recording section configured to execute data recording on the storage medium so as to write data into unit regions of a predetermined capacity formed successively in a storage region of the recording medium, said data recording section executing the data recording such that, when the request response write data corresponding to one data writing request is to be written using two or more of the unit regions and besides any of the top and the last end of the request response write data is to be written at an intermediate position of one of the unit regions, a partial writing process of writing the request response write data portion to be placed into the unit region which includes the intermediate position and another partial writing process of writing the remaining request response write data to be placed into one or more logically successive ones of the unit regions into which only those data which form the request response write data without including the intermediate position are to be placed are executed;

a file management section configured to manage files making use of management information which is stored in the storage medium on which data of files are stored and manages data which form the files for the unit regions;

a recording control section configured to control said data recording section to execute, when the request response write data is to be recorded on the storage medium by two or more of the partial writing processes, recording of the request response write data by the sequential partial writing processes without inserting an updating process of the management information at a timing corresponding to completion of each of the partial writing processes; and a file updating control section configured to control, at a timing after the recording of the request response write data by the sequential partial writing processes is completed, said file management section to update the management information so that results of all of the partial writing processes are reflected on the management information.

2. The data recording apparatus according to claim 1, wherein said recording data acquisition section acquires, as the request response write data, data formed such that a plurality of data units which are all or part of data which form a file of a predetermined format and have a predetermined significance in forming the file of the format are formed successively.

3. The data recording apparatus according to claim 2, wherein
said recording data acquisition section acquires the request response write data of a file of a format which includes data compression coded in accordance with a predetermined system, and
the data units of the request response write data which have the predetermined significance are minimum units necessary for a decoding process for the compression coded data.

4. The data recording apparatus according to claim 1, further comprising:
a progress information control section configured to control rewriting of the substance of progress information stored in a nonvolatile storage section such that a progress situation is indicated in response to progress of a sequence process in which the sequential partial writing processes executed under the control of said recording control section and the succeeding process of updating the file management information by said file updating control section are executed sequentially;
a backup information control section configured to execute control for writing or erasing backup information, which has the predetermined substance relating to the file management information and/or the request response write data portion according to a result of completion of the sequence process, into or from a nonvolatile storage section at a predetermined timing according to the progress of the sequence process; and
a matching restoration section configured to refer, in order that a state managed appropriately with the file management information may be obtained in a corresponding relationship to an actual result of writing of the request response write data in response to the last data writing request, to the progress information stored in said nonvolatile storage section and perform, based on the progress situation indicated by the progress information referred to, control for changing predetermined information in the file management information or control of a writing process on the storage medium making use of the predetermined backup information stored in said nonvolatile storage section as occasion demands.

5. The data recording apparatus according to claim 4, wherein said matching restoration section executes required control such that, where the progress information referred to indicates a progress situation of an intermediate portion of the sequence process, the request response write data to be written in response to the last data writing request is managed such that the request response write data is not stored on the storage medium.

6. The data recording apparatus according to claim 5, wherein
said backup information control section writes unit region use information representative of those unit regions on the storage medium to be used to write the request response write data according to the last data writing request as backup information into said nonvolatile storage section, and
said matching restoration section rewrites, when the progress information referred to indicates a progress situation of an intermediate portion of the sequence process at a timing after the process of causing those unit regions used for writing of the request response write data according to the last data writing request to be reflected on the file management information is completed, the file management information such that those unit regions indicated by the unit region use information of the backup information are treated as unused unit regions.

7. The data recording apparatus according to claim 4, wherein
said backup information control section writes file management relating information of the predetermined substance based on the file management information on which a result when writing of the request response write data according to the last data writing request is completed normally is reflected as backup information into said nonvolatile storage section, and
said matching restoration section utilizes, when the progress information referred to indicates a progress situation of an intermediate portion of the sequence process at a timing at which writing of all request response write data portions which form the request response write data according to the last data writing request is completed, the backup information as the file management relating information to rewrite the file management information such that the request response write data according to the last data writing request is managed appropriately such that the request response write data is stored on the storage medium.

8. The data recording apparatus according to claim 4, wherein
said backup information control section writes at least file management relating information of the predetermined substance based on the file management information on which a result when writing of the request response write data according to the last data writing request is completed normally is reflected, complementation real data having the data substance of the request response write data portion according to the last data writing request and data portion write position information indicative of the position into which the request response write data portion having the substance as the complementation real data is to be written, and
said matching restoration section executes, when the progress information referred to indicates a program situation of an intermediate portion of the sequence process at a timing at which writing of all request response write data portions which form the request response write data according to the last data writing request is not completed but writing of the request response write data portion or portions which can complete the request response write data together with the request response write data portion as the complementation real data is completed, control of writing the complementation real data of the backup information into a position of the storage medium indicated by the data portion writing position information and makes use of the file management relating information of the backup information to rewrite the file management information such that the request response write data according to the last data writing request is managed appropriately such that the request response write data is stored on the storage medium.

9. The data recording apparatus according to claim 8, wherein said backup information control section writes, at a timing before a predetermined request response write data portion is written, the complementation real data having the data substance of the predetermined request response write data portion and data portion writing position information indicative of a position into which the predetermined request response write data portion is to be written into said nonvolatile storage section, and erases the complementation real data and the data portion writing position information from said nonvolatile storage section at a timing at which the writing of the predetermined request response write data portion is completed.

10. A data recording method, comprising:

a recording data acquisition step of acquiring, as data to be recorded on a recording medium, request response write data which is a unit of data to be written on the recording medium in response to a data writing request;

a data recording step of executing data recording on the storage medium so as to write data into unit regions of a predetermined capacity formed successively in a storage region of the recording medium, the data recording being executed such that, when the request response write data corresponding to one data writing request is to be written using two or more of the unit regions and besides any of the top and the last end of the request response write data is to be written at an intermediate position of one of the unit regions, a partial writing process of writing the request response write data portion to be placed into the unit region which includes the intermediate position and another partial writing process of writing the remaining request response write data to be placed into one or more logically successive ones of the unit regions into which only those data which form the request response write data without including the intermediate position are to be placed are executed;

a file management step of managing files making use of management information which is stored in the storage medium on which data of files are stored and manages data which form the files for the unit regions;

a recording control step of controlling such that, when the request response write data is to be recorded on the storage medium by two or more of the partial writing processes, recording of the request response write data by the sequential partial writing processes is executed by the data recording step without inserting an updating process of the management information at a timing corresponding to completion of each of the partial writing processes; and a file updating control step of controlling, at a timing after the recording of the request response write data by the sequential partial writing processes is completed, such that the management information is updated by the file management step so that results of all of the partial writing processes are reflected on the management information.

11. A computer-readable-medium having stored therein a program for causing a data recording apparatus to execute a data recording method, the method comprising:

a recording data acquisition step of acquiring, as data to be recorded on a recording medium, request response write data which is a unit of data to be written on the recording medium in response to a data writing request;

a data recording step of executing data recording on the storage medium so as to write data into unit regions of a predetermined capacity formed successively in a storage region of the recording medium, the data recording being executed such that, when the request response write data corresponding to one data writing request is to be written using two or more of the unit regions and besides any of the top and the last end of the request response write data is to be written at an intermediate position of one of the unit regions, a partial writing process of writing the request response write data portion to be placed into the unit region which includes the intermediate position and another partial writing process of writing the remaining request response write data to be placed into one or more logically successive ones of the unit regions into which only those data which form the request response write data without including the intermediate position are to be placed are executed;

a file management step of managing files making use of management information which is stored in the storage medium on which data of files are stored and manages data which form the files for the unit regions;

a recording control step of controlling such that, when the request response write data is to be recorded on the storage medium by two or more of the partial writing processes, recording of the request response write data by the sequential partial writing processes is executed by the data recording step without inserting an updating process of the management information at a timing corresponding to completion of each of the partial writing processes; and a file updating control step of controlling, at a timing after the recording of the request response write data by the sequential partial writing processes is completed, such that the management information is updated by the file management step so that results of all of the partial writing processes are reflected on the management information.

* * * * *